(12) United States Patent
Lin et al.

(10) Patent No.: US 10,990,131 B2
(45) Date of Patent: *Apr. 27, 2021

(54) TOUCH SENSOR, TOUCH PANEL AND METHOD FOR MANUFACTURING THE SAME

(71) Applicant: TPK Touch Solutions (Xiamen) Inc., Xiamen (CN)

(72) Inventors: Ching-Shan Lin, Tainan (TW); Chun-Yan Wu, Fuzhou (CN); Chung-Chin Hsiao, Hsinchu (TW); Hwai-Hai Chiang, Taipei (TW)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 47 days.

This patent is subject to a terminal disclaimer.

(21) Appl. No.: 16/228,785

(22) Filed: Dec. 21, 2018

(65) Prior Publication Data

US 2019/0196549 A1 Jun. 27, 2019

(30) Foreign Application Priority Data

Dec. 21, 2017 (CN) .......................... 201711392589.4

(51) Int. Cl.
- *G06F 1/16* (2006.01)
- *G06F 3/047* (2006.01)
- *G06F 3/041* (2006.01)
- *G06F 3/044* (2006.01)

(52) U.S. Cl.
CPC .......... *G06F 1/1652* (2013.01); *G06F 1/1643* (2013.01); *G06F 3/041* (2013.01); *G06F 3/047* (2013.01); *G06F 3/044* (2013.01); *G06F 3/0412* (2013.01); *G06F 2203/04102* (2013.01); *G06F 2203/04103* (2013.01); *G06F 2203/04107* (2013.01)

(58) Field of Classification Search
CPC ...... G06F 1/1652; G06F 1/1643; G06F 3/041; G06F 3/044; G06F 3/047; G06F 3/0412; G06F 2203/04103; G06F 2203/04102; G06F 2203/04107
See application file for complete search history.

(56) References Cited

U.S. PATENT DOCUMENTS

| | | | |
|---|---|---|---|
| 2014/0042001 A1* | 2/2014 | Wang | H03K 17/9618 200/295 |
| 2014/0152580 A1* | 6/2014 | Weaver | G06F 3/0418 345/173 |
| 2015/0109542 A1* | 4/2015 | Wu | G06F 3/041 349/12 |
| 2016/0034066 A1* | 2/2016 | Nah | G06F 3/044 345/174 |
| 2016/0326388 A1* | 11/2016 | Petcavich | C09D 11/033 |
| 2018/0346761 A1* | 12/2018 | Chen | G06F 3/0446 |
| 2018/0364834 A1* | 12/2018 | Kwon | G06F 3/044 |

* cited by examiner

*Primary Examiner* — Kent W Chang
*Assistant Examiner* — Andrew Lee
(74) *Attorney, Agent, or Firm* — Cooper Legal Group, LLC

(57) ABSTRACT

A manufacturing method of touch sensors is provided. A flexible touch sensing component can be formed on a first substrate by a release layer. Next, the flexible touch sensing component is transferred to a second substrate after a releasing step. Furthermore, by the support of the second substrate, the flexible touch sensing component can be processed and then adhered a desired cover. After releasing the second substrate from the flexible touch sensing component, the touch sensor is formed.

31 Claims, 12 Drawing Sheets

TOUCH SENSOR, TOUCH PANEL AND METHOD FOR MANUFACTURING THE SAME

CROSS-REFERENCE TO RELATED APPLICATION

This application claims priority to China Application Serial Number 201711392589.4, filed Dec. 21, 2017, which is herein incorporated by reference.

BACKGROUND

Field of Disclosure

The present disclosure relates to the field of touch sensing technology, especially relates to a touch sensor, a touch panel, and a manufacturing method thereof.

DESCRIPTION OF RELATED ART

In today's consumer electronics market, touch panels are extensively used in various electronic products, such as smart phones, mobile phones, tablet computers, and laptops. The user operates and gives commands on the touch-sensing screens. Therefore, the touch panels serve as a user-friendly operation interface between the user and the electronic product.

In current processes for manufacturing touch panels, touch sensors are formed by forming a touch sensing component on a substrate through sputtering and lithography processes under a high temperature. The substrate of the touch sensing component is made of a material with sufficient stiffness and a planar surface, such as glass or other transparent substrates.

SUMMARY

The disclosure provides a touch sensor, a touch panel and a manufacturing method thereof. The touch panel has a lightweight, thin, and low manufacturing cost. The touch panel is suitable to be used in flexible touch displays and curved touch displays.

In some embodiments of the present invention, a manufacturing method of a touch sensor is provided. The manufacturing method includes the steps of S1 to S4. Step S1 includes forming a first release layer on a first substrate. Step S2 includes forming a flexible touch sensing component on the first release layer. Step S3 includes forming a second substrate on the flexible touch sensing component, and a second release layer is interposed between the flexible touch sensing component and the second substrate. Step S4 includes removing the first substrate by releasing the first release layer.

Preferably, the flexible touch sensing component is a film-type sensor.

Preferably, the film-type sensor has a thin film and a nano-metal conductive layer formed on the thin film.

Preferably, the nano-metal conductive layer includes a silver nanowire layer and an overcoat layer.

Preferably, the nano-metal conductive layer further includes a passivation layer or a primer layer thereon.

Preferably, the film-type sensor has a thin film, a first nano-metal conductive layer, and a second nano-metal conductive layer. The first nano-metal conductive layer and the second nano-metal conductive layer are formed on opposite surfaces of the thin film.

Preferably, each of the first nano-metal conductive layer and the second nano-metal conductive layer includes a silver nanowire layer and an overcoat layer. Preferably, the silver nanowire layer is electrically connected to a peripheral circuit.

Preferably, the first nano-metal conductive layer further includes a hardcoat layer thereon, and the second nano-metal conductive layer further includes a passivation layer thereon.

Preferably, the first nano-metal conductive layer or the second nano-metal conductive layer further includes a protection layer thereon.

Preferably, the film-type sensor has a first thin film, a first nano-metal conductive layer formed on the first thin film, a second thin film, and a second nano-metal conductive layer formed on the second thin film. The first thin film and the second thin film are adhered to each other. The first nano-metal conductive layer and the second nano-metal conductive layer face in opposite directions. Preferably, the film-type sensor further includes a peripheral circuit electrically connected to the first nano-metal conductive layer and the second nano-metal conductive layer.

Preferably, the first nano-metal conductive layer further includes a hardcoat layer thereon, and the second nano-metal conductive layer further includes a passivation layer thereon.

Preferably, the first nano-metal conductive layer or the second nano-metal conductive layer further includes a primer protection thereon.

Preferably, the film-type sensor includes a thin film and a transferable transparent conductive film adhered or attached to the thin film.

Preferably, a bonding layer is disposed between the flexible touch sensing component and the first release layer.

Preferably, the manufacturing method further includes forming a flexible electrode component between the flexible touch sensing component and the bonding layer.

Preferably, each of the steps of S1 and S2 is performed by a roll-to-roll process.

Preferably, in the step S4, the first release layer is completely removed or partially removed.

Preferably, the manufacturing method further includes forming a flexible electrode component between the flexible touch sensing component and the first release layer or forming a flexible electrode component between the flexible touch sensing component and the second release layer.

Preferably, the flexible electrode component has a thin film and a nano-metal conductive layer formed on the thin film.

Preferably, the nano-metal conductive layer further includes a passivation layer, a primer layer, or a hardcoat layer thereon.

In some embodiments of the present invention, a manufacturing method of a touch panel is provided. The manufacturing method includes the steps of S1 to S6. Step S1 includes forming a first release layer on a first substrate. Step S2 includes forming a flexible touch sensing component on the first release layer. Step S3 includes forming a second substrate on the flexible touch sensing component, and a second release layer is disposed between the flexible touch sensing component and the second substrate. Step S4 includes removing the first release layer by releasing the first substrate. Step S5 includes adhering a decorative flexible cover to the flexible touch sensing component by using a bonding layer, and the bonding layer is disposed between the decorative flexible cover and the flexible touch sensing component. Step S6 includes removing the second substrate by releasing the second release layer.

Preferably, the decorative flexible cover includes a thin film layer and a shielding layer disposed on the thin film layer.

Preferably, the step S5 includes adhering the bonding layer to the decorative flexible cover, followed by adhering the decorative flexible cover having the bonding layer adhered to thereon to the flexible touch sensing component.

Preferably, the bonding layer is disposed between the flexible touch sensing component and the first release layer. After the first release layer is removed in S4, the bonding layer is exposed, and then the decorative flexible cover is adhered to the exposed bonding layer.

Preferably, the manufacturing method further includes forming a flexible electrode component between the flexible touch sensing component and the bonding layer.

In some embodiments of the disclosure, a manufacturing method of a touch panel is provided. The manufacturing method includes the steps of S1 to S6. Step S1 includes forming a first release layer on a first substrate. Step S2 includes forming a shielding layer and a flexible touch sensing component on the first release layer, and the shielding layer is integrated with the flexible touch sensing component. Step S3 includes forming a second substrate on the flexible touch sensing component, and a second release layer is disposed between the flexible touch sensing component and the second substrate. Step S4 includes removing the first substrate by releasing the first release layer. Step S5 includes adhering a flexible cover to the flexible touch sensing component by using a bonding layer, and the bonding layer is disposed between the flexible cover and the flexible touch sensing component. Step S6 includes removing the second substrate by releasing the second release layer.

Preferably, the shielding layer is formed by printing a colored material on the flexible touch sensing component.

Preferably, the manufacturing method further includes forming a flexible electrode component between the flexible touch sensing component and the first release layer. The shielding layer is by printing a colored material on the flexible electrode component.

Preferably, the step S5 includes adhering the bonding layer to the flexible cover, followed by adhering the flexible cover having the bonding layer adhered thereon to the flexible touch sensing component and the shielding layer.

Preferably, the bonding layer is disposed between the flexible touch sensing component and the first release layer. After removing the first release layer in the step S4, the bonding layer is exposed, and then the flexible cover is adhered to the exposed bonding layer.

Preferably, the manufacturing method further includes forming a flexible electrode component between the flexible touch sensing component and the bonding layer. The shielding layer is integrated with the flexible electrode component. The shielding layer is formed by printing a colored material on the flexible electrode component.

Preferably, the manufacturing method further includes forming a flexible electrode component between the flexible touch sensing component and the second release layer.

In some embodiments of the present invention, a manufacturing method of a touch panel is provided. The manufacturing method includes step S1 to step S6. Step S1 includes forming a first release layer on a first substrate. Step S2 includes forming a decorative flexible cover on the first release layer. Step S3 includes forming a flexible touch sensing component on the decorative flexible cover. Step S4 includes forming a second substrate on the flexible touch sensing component, and a second release layer is disposed between the flexible touch sensing component and the second substrate. Step S5 includes removing the first substrate by using the first release layer. Step S6 includes removing the second substrate by releasing the second release layer.

Preferably, the decorative flexible cover includes a thin film layer and a shielding layer integrated with the thin film layer. the shielding layer is disposed on the thin film layer.

Preferably, the film-type sensor has a first thin film, a first nano-metal conductive layer formed on the first thin film, a second thin film, and a second nano-metal conductive layer formed on the second thin film. The first thin film and the second nano-metal conductive layer are adhered to each other so that the second nano-metal conductive layer is disposed between the first and second thin films.

Preferably, the steps S1, S2 and S3 are performed in a roll-to-roll process.

Preferably, in the step S5, the first release layer is completely removed.

In some embodiments of the present invention, a touch sensor for transferring onto a non-planar surface is provided. The touch sensor includes a carrier substrate, a flexible touch sensing component, and a release layer disposed between the flexible touch sensing component and the carrier substrate.

Preferably, the touch sensor further includes a flexible electrode component. The nano-metal conductive layer is disposed on a first surface of the thin film, and the flexible electrode component is disposed on a second surface of the thin film.

Preferably, the touch sensor further includes a flexible electrode component disposed on the nano-metal conductive layer. The flexible electrode component and the nano-metal conductive layer are electrically insulated from each other.

Preferably, the touch sensor further includes a flexible electrode component disposed on the first nano-metal conductive layer. The flexible electrode component and the first nano-metal conductive layer are electrically insulated from each other.

Preferably, the touch sensor further includes a flexible electrode component disposed on the second nano-metal conductive layer. The flexible electrode component and the first nano-metal conductive layer are electrically insulated from each other. The flexible electrode component is disposed between the second nano-metal conductive layer and the release layer.

Preferably, the touch sensor further includes a flexible electrode component disposed on the first nano-metal conductive layer. The flexible electrode component and the first nano-metal conductive layer are electrically insulated from each other.

Preferably, the touch sensor further includes a flexible electrode component disposed between the flexible touch sensing component and the release layer. The flexible electrode component and the second nano-metal conductive layer are respectively disposed on opposite surfaces of the second thin film. The flexible electrode component and the second nano-metal conductive layer are electrically insulated from each other.

Preferably, the touch sensor further includes a bonding layer disposed on the flexible touch sensing component.

Preferably, the touch sensor further includes a flexible electrode component disposed or interposed between the bonding layer and the flexible touch sensing component.

Preferably, the touch sensor further includes a remaining release layer disposed on the flexible touch sensing component. The remaining release layer is a material of the release layer remained on the released surface.

In some embodiments of the present invention, a touch panel for transferring onto a non-planar surface is provided. The touch panel includes a decorative flexible cover, a flexible touch sensing component, and a bonding layer interposed between the flexible touch sensing component and the decorative flexible cover.

Preferably, the touch panel further includes a flexible electrode component disposed on the first nano-metal conductive layer. The flexible electrode component and the first nano-metal conductive layer are electrically insulated from each other. The flexible electrode component is disposed between the first nano-metal conductive layer and the bonding layer.

Preferably, the touch panel further includes a first release layer remaining on the flexible touch sensing component after a releasing step. The remained first release layer is interposed between the flexible touch sensing component and the bonding layer.

Preferably, the touch panel further includes a flexible electrode component disposed between the remained first release layer and the flexible touch sensing component.

In some embodiments of the present invention, a touch panel for transferring onto a non-planar surface. The touch panel includes a flexible cover, a flexible touch sensing component, a bonding layer disposed between the flexible touch sensing component and the flexible cover, and a shielding layer defining a peripheral area of the touch panel.

Preferably, the shielding layer is a colored material layer printed on the flexible touch sensing component.

Preferably, the touch panel further includes a flexible electrode component disposed on the flexible touch sensing component or between the flexible touch sensing component and the bonding layer. The shielding layer is a colored material layer printed on the flexible electrode component.

Preferably, the nano-metal conductive layer further includes a passivation layer, a primer layer, or a hardcoat layer thereon.

In some embodiments of the present invention, a touch panel that is for transferring onto a non-planar surface is provided. The touch panel includes a decorative flexible cover, and a flexible touch sensing component. The flexible touch sensing component and the decorative flexible cover are in direct contact with each other.

Preferably, the decorative flexible cover includes a thin film layer and a shielding layer integrated with on the thin film layer.

Preferably, the film-type sensor has a thin film and a nano-metal conductive layer formed on the thin film. The thin film layer of the decorative flexible cover is directly adhered to the thin film of the film-type sensor.

Preferably, the touch panel further includes a flexible electrode component disposed on the nano-metal conductive layer. The nano-metal conductive layer is disposed on a first surface of the thin film, and the thin film layer of the decorative flexible cover is disposed on a second surface the thin film. The flexible electrode component and the nano-metal conductive layer are electrically insulated from each other.

Preferably, the film-type sensor has a thin film, a first nano-metal conductive layer, and a second nano-metal conductive layer. The first nano-metal conductive layer and the second nano-metal conductive layer are formed on opposite surfaces of the thin film.

Preferably, the touch panel further includes a flexible electrode component disposed on the second nano-metal conductive layer. The thin film layer of the decorative flexible cover is directly adhered to the first nano-metal conductive layer. The flexible electrode component and the second nano-metal conductive layer are electrically insulated from each other.

Preferably, the touch panel further includes a flexible electrode component disposed between the decorative flexible cover and the flexible electrode component.

DETAILED DESCRIPTION

Figure 1A:
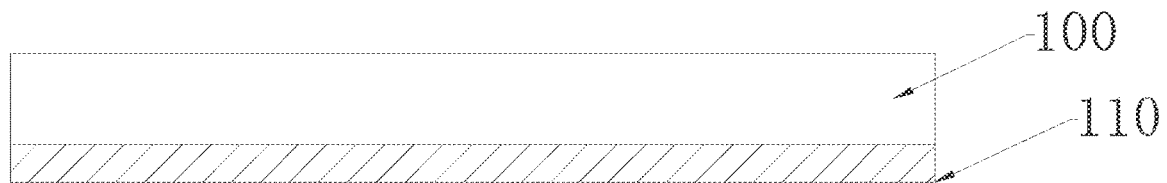
FIGS. 1A~1D show steps of a manufacturing method of a touch sensor according to one embodiment of the disclosure.

The present invention is disclosed with accompanying drawings and embodiments for detailed description.

The present disclosure may repeat reference numerals and/or letters in the various examples. This repetition is for the purpose of simplicity and clarity and does not in itself dictate a relationship between the various embodiments and/or configurations discussed. For example, the formation of a first feature over or on a second feature in the description that follows may include embodiments in which the first and second features are formed in direct contact, and may also include embodiments in which additional features may be formed between the first and second features, such that the first and second features may not be in direct contact. It is noted that, various features are not drawn to scale, and the dimensions of the various features may be arbitrarily increased or reduced for clarity of discussion. It will be understood that, although the terms first, second, etc. may be used herein to describe various elements, these elements, should not be limited by these terms. For example, "first release layer" or "second release layer" both may refer to "release layer".

Figure 1B:
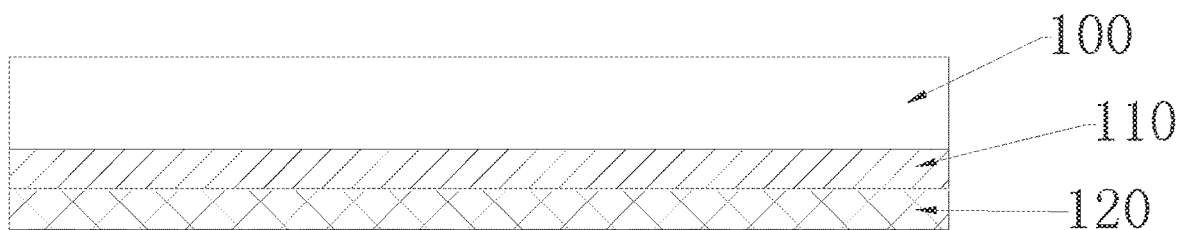
Figure 1C:
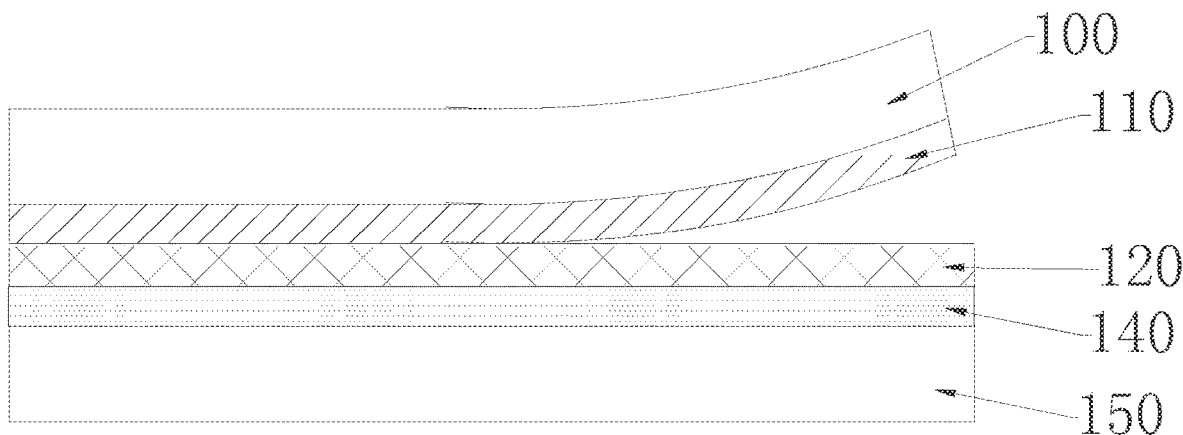
Figure 1D:
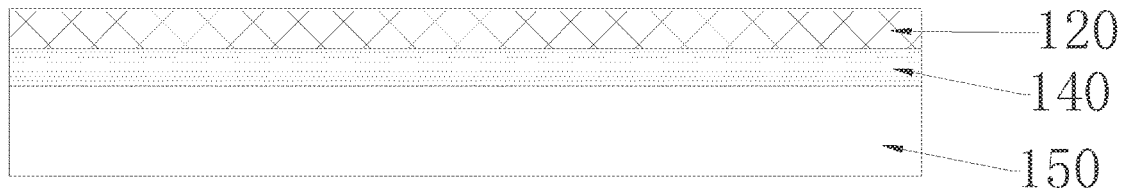

FIGS. 1A~1D are a flow chart of a manufacturing method of a touch sensor according to one embodiment of the present invention. FIG. 1D is also a structural view of the touch sensor formed in a manufacturing method according to one embodiment of the present invention.

Referring to FIG. 1A. First, a first substrate 100 is provided, and a first release layer 110 is formed on the first substrate 100. The first substrate 100 may serve as a mechanical support for the structure formed in the subsequent steps; that means, the first substrate 100 is a temporary platform where a touch sensor 10 is manufactured thereon. The touch sensor 10 may be removed/released from the first substrate 100 as a final product. The first substrate 100 may be made of transparent or opaque insulating materials, such as a glass substrate or a flexible PET substrate. As the first substrate 100 is not a part of the final product, the first substrate 100 can be made of a relatively low-cost material as long as it provides the necessary mechanical support. For example, in order to reduce the manufacturing cost of the touch panel, the first substrate 100 may be made of a row glass instead of a chemically strengthened glass. In addition, the first substrate 100 may be made of a flexible material such as plastics or resin, including but not limited to polycarbonate (PC), poly(methyl methacrylate) (PMMA), polyethylene terephthalate (PET), polyethersulfone (PES), polyimide (PI), cellulose ester, benzocyclobutene (BCB), polyvinyl chloride (PVC), acrylic resin, and the like. Moreover, after released, the first substrate 100 can be recycled and reuse, and thus the manufacturing cost can be reduced. It is noted that the first substrate 100 is not limited to a flexible substrate such as plastics or resin. The first substrate 100 may be made of any other suitable material that can provide a mechanical support. The first release layer 110 is a thin film layer made of a releasable material. The term "release layer or releasable layer" in this disclosure stands for the capability of the layer for attaching two or more layers and for separating the attached layers. For example, the first release layer 110 means the layer is used to attach the first substrate 100 with another layer, and a person can remove the first substrate 100 from the first release layer 110 when needed Alternatively, the first substrate 100 and the first release layer 110 are simultaneously removed from the layer that is originally attached to the first release layer 110 and the first substrate 100. The first release layer 110 may be made of an organic material, such as polyimide (PI), polypropylene (PP), polystyrene (PS), Acrylonitrile-Butadiene-Styrene (ABS), polyethylene terephthalate (PET), polyvinyl chloride (PVC), polycarbonate (PC), polyethylene (PE), poly(methyl methacrylate) (PMMA), polytetrafluoroethylene (PTFE), cyclic olefin copolymer (COP, Arton), or a combination thereof. The first release layer 110 may be formed on the first substrate 100 by a solution coating and baking process, a vapor deposition process, a roll-to-roll process (RTR), other suitable processes, or directly laminating the dried first release layer 110 on the first substrate 100. In one embodiment, the first release layer 110 may be attached or adhered to the first substrate 100 by using a removable adhesive. The removable adhesive may include a water-insoluble adhesive or any other suitable material that can temporarily attach two layers together and can be dissolved or otherwise removed. The first substrate 100 can be completely or partially removed from the first release layer 110 by dissolving the removable adhesive. Preferably, the first release layer 110 is a multi-layer structure. For example, the first release layer 110 may also be a thin film layer having an upper layer with releasable capability and a lower layer without releasable capability. The upper layer of the first release layer 110 is away from the first substrate 100, whereas the lower layer of the first release layer 110 is near to the first substrate 100. Therefore, the first substrate 100 is attached to an object (i.e., a touch sensor) using the first release layer 110 in advance. Then the attached object may be processed in desired steps. When processes are finished, the first substrate 100 and the first release layer 110 can be removed simultaneously from the object as the upper layer of the first release layer 110 is released. In this embodiment, as the first substrate 100 and the first release layer 110 are simultaneously removed, the processed touch sensor 10 may not have increasing weight and thickness, and meanwhile the optical properties of the touch sensor 10, such as high transmittance and low haze may not be influenced.

Next, referring to FIG. 1B, a flexible touch sensing component 120 is formed on the first release layer 110, and the first release layer 110 is interposed between the first substrate 100 and the flexible touch sensing component 120. The flexible touch sensing component 120 is a film-type sensor which includes a thin film and a transferable transparent conductive film attached to the thin film. The film-type sensor is flexible or deformable, i.e., the film-type sensor can be pressed or forced to have a bent shape temporarily or permanently.

Next, referring to FIG. 10, a second substrate 150 is formed over the flexible touch sensing component 120. A second release layer 140 is interposed between the flexible touch sensing component 120 and the second substrate 150. The second release layer 140 and the first release layer 110 are made of a thin film layer having a releasable ability. However, the chemical compositions of the second release layer 140 and the first release layer 110 may be the same or different. The second substrate 150 and the first substrate 100 may be made of the same material or difference materials. The second substrate 150 may be removed from the flexible touch sensing component 120 by releasing the second release layer 140. Alternatively, the second substrate 150 and the second release layer 140 may be removed simultaneously from the flexible touch sensing component 120. In the present embodiment, the second substrate 150 serves as a support, and therefore the second substrate 150 may be termed as a carrier substrate. The second substrate 150 may be made of a thin film having a predetermined support strength, and it can be termed as a carrier film. FIG. 10 also shows a first releasing step for removing the first substrate 100 by the first release layer 110.

Next, referring to FIG. 1D, the first substrate 100 is removed by releasing the first release layer 110 to form a touch sensor 10. The first substrate 100 is removed from the flexible touch sensing component 120, such that the flexible touch sensing component 120 may be transferred onto a desired object including a non-planar target substrate. The non-planar target substrate may be a flexible cover or a deformable cover. Alternatively, the non-planar target substrate may be a rigid, or semi-rigid curved cover. The rigid curved cover may be permanently formed into a curved surface. The semi-rigid, flexible and deformable curved cover may be temporarily formed into a curved surface or a non-curved surface. The first substrate 100 may be removed by a chemical etching process, for example a chemical such as hydrogen fluoride in the step of releasing the first release layer 110. Alternatively, the first substrate 100 may be removed by a mechanical process, such as a vibration or a combination of chemical processes and mechanical processes. Preferably, the first substrate 100 and the first release layer 110 may be removed simultaneously, such that the touch-sensing product of the disclosure can keep light-weight, and thin properties because no undesired materials of release layer is remained on the flexible touch sensing component 120. In addition, totally removing the undesired materials of release layer may result in good optical properties, such as high transmittance of the touch-sensing product of the disclosure. Alternatively, in the releasing step, the first release layer 110 may substantially or partially remain on the flexible touch sensing component 120 so as to protect the surface of the flexible touch sensing component 120.

After releasing the first release layer 110 to removing the first substrate 100 from the flexible touch sensing component 120, the flexible touch sensing component 120 is exposed to be processed. For example, an additional electrode, such as a flexible electrode component 124 is attached on the flexible touch sensing component 120, or one or more layers of colored ink is printed on the flexible touch sensing component 120 to define a peripheral area. Alternatively, a patterning process, such as an etch step is conducted on the flexible touch sensing component 120 to define the electrode patterns of touch-sensing electrodes. Accordingly, the processed flexible touch sensing component 120 can be transferred onto the desired object.

Figure 1E:
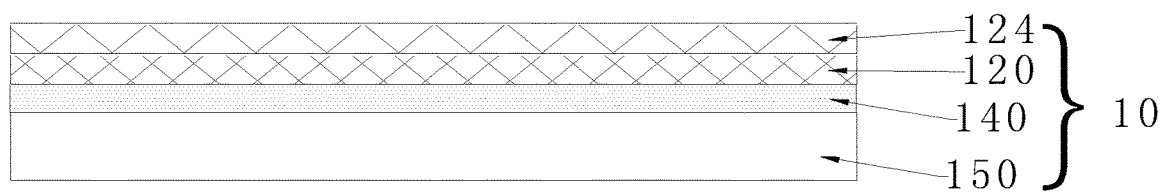
FIG. 1E is a schematic structural view of a touch sensor formed by a manufacturing method according to another embodiment of the disclosure.

FIG. 1E is one other schematic structural view of a touch sensor 10 formed by a manufacturing method according to one embodiment of the disclosure. Referring to FIG. 1E and FIG. 10 together, the touch sensor 10 further includes a flexible electrode component 124. The flexible electrode component 124 may be disposed between the flexible touch sensing component 120 and the first release layer 110. During the removal of the first substrate 100 by releasing the first release layer 110, the flexible electrode component 124 is exposed (or the first release layer 110 substantially or partially remains on the flexible electrode component 124) to form the touch sensor 10. Accordingly, the touch sensor 10 including flexible electrode component 124, flexible touch sensing component 120, second release layer 140, and second substrate 150 may be subsequently transferred onto any desired target substrate. Alternatively, the flexible electrode component 124 may be disposed between the flexible touch sensing component 120 and the second release layer 140. It is understood that the flexible electrode component 124 and the flexible touch sensing component 120 are electrically insulated from each other. The detailed description of the flexible electrode component 124 is provided below.

Figure 1F:
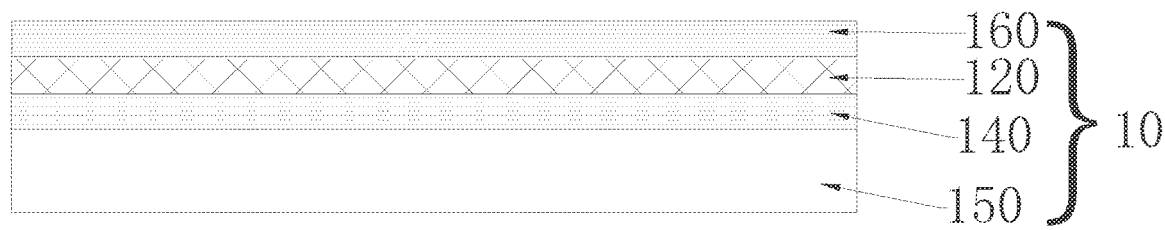
FIG. 1F is a schematic structural view of a touch sensor formed by a manufacturing method according to still another embodiment of the disclosure.

FIG. 1F is still another schematic structural view of a touch sensor 10 formed by a manufacturing method according to one embodiment of the disclosure. Referring to FIG. 1F and FIG. 10 together, the touch sensor 10 further includes a bonding layer 160 disposed between the flexible touch sensing component 120 and the first release layer 110. During the removal of the first substrate 100 by releasing the first release layer 110, the bonding layer 160 is exposed. As the bonding layer 160 has adhesion property, the touch sensor 10 may be directly adhered to desired target substrate. The bonding layer 160 may be made of a reactive ink adhesive layer. Since the adhesion of the reactive ink layer is maintained after the removal of the first release layer 110, therefore the touch sensor 10 can be directly adhered to the desired target substrate without additional optical adhesive layer or hydrogel.

Figure 1G:
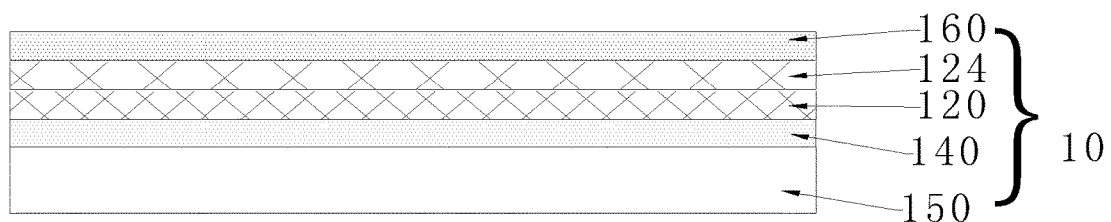
FIG. 1G is a schematic structural view of a touch sensor formed by a manufacturing method according to further another embodiment of the disclosure.

FIG. 1G is one more schematic structural view of a touch sensor 10 formed by a manufacturing method according to one embodiment of the disclosure. In one embodiment, the touch sensor 10 in FIG. 1G further includes both the bonding layer 160 and the flexible electrode component 124. The bonding layer 160 and the flexible electrode component 124 may be disposed between the flexible touch sensing component 120 and the first release layer 110. The flexible electrode component 124 may be disposed between the flexible touch sensing component 120 and the bonding layer 160, while the bonding layer 160 may be disposed between the flexible electrode component 124 and the first release layer 110. The flexible electrode component 124 and the flexible touch sensing component 120 are electrically insulated from each other. During the removal of the first substrate 100 by releasing the first release layer 110, the bonding layer 160 is exposed, such that the touch sensor 10 may be subsequently transferred onto desired target substrate. Alternatively, the bonding layer 160 is disposed between the flexible touch sensing component 120 and the first release layer 110, while the flexible electrode component 124 is disposed between the flexible touch sensing component 120 and the second release layer 140.

The various touch sensors 10 as shown in FIG. 1D to FIG. 1G are finally formed through the above steps. The details of each touch sensor 10 are introduced below. The upper side of FIGS. 1D to 1G represents the touching position and viewing position of the user after the touch sensor 10 has been assembled with a display to form a touch display. The touch sensor 10, as shown in FIG. 1D, includes, from top to bottom, the flexible touch sensing component 120, the second release layer 140 (it is noted that the term "second" used herein is merely for ease of description, and is irrelevant with the quantity or arrangement order. Therefore the second release layer 140 may be referred to as "release layer"), and the second substrate 150 (i.e., carrier substrate). As shown in FIG. 1E, the touch sensor 10 includes, from top to bottom, the flexible electrode component 124, the flexible touch sensing component 120, the second release layer 140 (which may be referred to as "release layer"), and the second substrate 150 (i.e., carrier substrate). As shown in FIG. 1F, the touch sensor 10 includes, from top to bottom, the bonding layer 160, the flexible touch sensing component 120, the second release layer 140 (i.e., the release layer), and the second substrate 150 (i.e., carrier substrate). As shown in FIG. 1G, the touch sensor 10 includes, from top to bottom, the bonding layer 160, the flexible electrode component 124, the flexible touch sensing component 120, the second release layer 140 (i.e., the release layer) and the second substrate 150 (i.e., carrier substrate). The details of the structures, materials, and manufacturing method of the abovementioned components have been described above, and therefore are not repeated herein. The touch sensor 10 may be used in touch display devices, such as computer systems, mobile phones, digital media players, tablet computers, ultra-thin laptops, wearable touch devices, in-vehicle touch monitor, and the like. The touch sensors 10 as shown in FIG. 1D to FIG. 1G further includes a remaining release layer (i.e., the remaining first release layer 110 during the removal of the first substrate 100 by releasing the first release layer 110) disposed on the flexible touch sensing component 120. The remaining release layer 110 may protect the flexible touch sensing component 120 when the touch sensor 10 is transported between working stations.

Figure 2A:
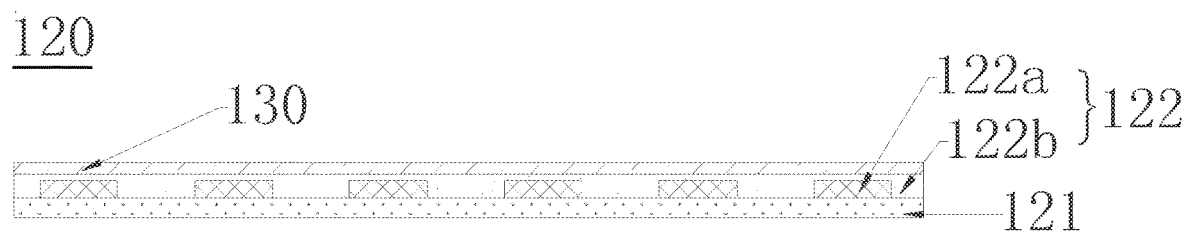
FIGS. 2A~2F are structural views of a film-type sensor according to some embodiments of the disclosure.

Referring to FIG. 2A. FIG. 2A is a structural view of a film-type sensor according to one embodiment of the disclosure. In one embodiment, the film-type sensor i.e., the flexible touch sensing component 120 has a thin film 121 and a nano-metal conductive layer 122 formed on the thin film 121. The nano-metal conductive layer 122 includes a metal nanowire layer, such as a silver nanowire layer 122a and an overcoat (OC) layer 122b. The durability of the silver nanowire layer 122a may be increased with the present of the overcoat layer 122b. The film-type sensor may be formed by depositing a plurality of metal nanowires dispersed in a fluid on the thin film 121, including a strip coating process, a mesh coating process, a printing process, a lamination process or a roll to roll process (RTR), followed by drying the fluid to form a metal nanowire network layer on the thin film 121, and then patterning the metal nanowire network layer to form the nano-metal conductive layer 122. In addition, the thin film 121 may be subjected to a surface pre-treatment process, such that the metal nanowires can be deposited on the thin film 121 with higher adhesion. The surface pre-treatment process of the thin film 121 may bring some advantages, for example, the nanowires can be evenly deposited and firmly affixed to the thin film 121. The overcoat layer 122b may be formed of an optical transparent polymer matrix. The polymer matrix includes but not limited to: polyacrylics, such as polymethacrylates (for example, poly(methyl methacrylate)), polyacrylates and polyacrylonitrile, poly(vinyl alcohol); polyester (for example, poly(ethylene terephthalate) (PET), poly(ethylene 2,6-naphthalate) and polycarbonate); high aromaticity polymer, such as phenol formaldehyde resin or cresol-formaldehyde; polystyrene; poly(vinyl toluene); polyvinyl xylene; polyimide; polyamide; polyamide-imide; poly(etherimide); polysulfide, polysulfone; poly(phenylene); polyphenylene ether; polyurethane (PU); epoxy; polyolefin (for example, polypropylene, polymethylpentene, and cycloalkene); acrylonitrile-butadiene-styrene copolymer (ABS); cellulose; silicone and other silicon-containing polymers (for example, polysilsesquioxanes and polysilanes); polyvinyl chloride (PVC); polyacetate; polynorbornene; synthetic rubber (for example, EPR, SBR, and EPDM); fluoropolymer (for example, polyvinylidene fluoride, polytetrafluoroethylene (TFE) or polyhexafluoropropylene); copolymer of fluoroolef ins and hydrocarbon olefins, and amorphous fluorocarbon polymers or copolymers.

In one embodiment, the nano-metal conductive layer 122 further includes a passivation layer or a primer layer 130 disposed thereon. In other words, the passivation layer or the primer layer 130 is disposed between the nano-metal conductive layer 122 and the first release layer 110. The nano-metal conductive layer 122 may be directly formed on the passivation layer or the primer layer 130. The passivation layer or the primer layer 130 is generally made of a flexible material, which includes but not limited to: polyester, polyethylene terephthalate (PET), polybutylene terephthalate, polymethyl methacrylate (PMMA), acrylic resin, polycarbonate (PC), polystyrene, triacetic acid Ester (TAC), polyvinyl alcohol, polyvinyl chloride, polyvinylidene chloride, polyethylene, copolymer of ethylene and vinyl acetate, polyvinyl butyral, copolymer of metal ion, crosslinked ethylene and methacrylic acid, polyurethane, cellophane, polyolefin, and the like. Preferably, the passivation layer or the primer layer 130 is made of PET, PC, PMMA, or TAC having a higher mechanical strength.

In one embodiment, after releasing the first release layer 110 to removing the first substrate 100 from the flexible touch sensing component 120, the flexible touch sensing component 120 is exposed to be processed. For example, an additional electrode, such as a flexible electrode component 124 is attached on the overcoat (OC) layer 122b of the flexible touch sensing component 120, or one or more layers of colored ink is printed on the overcoat (OC) layer 122b to define a peripheral area. Alternatively, a patterning process, such as an etch step is conducted onto the metal nanowire layer to define the electrode patterns of touch-sensing electrodes.

Figure 2B:
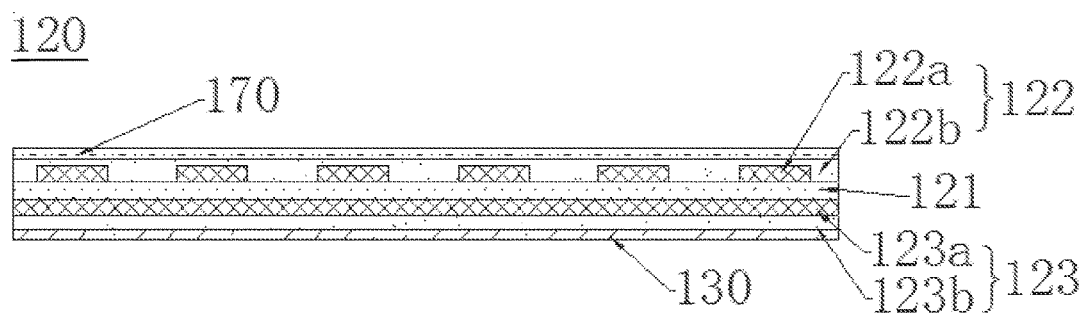

Referring to FIG. 2B. FIG. 2B is another structural view of the film-type sensor according to one embodiment of the disclosure. In one embodiment, the film-type sensor i.e., the flexible touch sensing component 120 has a thin film 121, a first nano-metal conductive layer 122, and a second nano-metal conductive layer 123. The first nano-metal conductive layer 122 and the second nano-metal conductive layer 123 are formed on opposite surfaces of the thin film 121. The first nano-metal conductive layer 122 includes a metal nanowire layer, such as a silver nanowire layer 122a and an overcoat layer 122b. The second nano-metal conductive layer 123 includes a metal nanowire layer, such as a silver nanowire layer 123a and an overcoat layer 123b. The durability of the silver nanowire layer 122a may increase in the present of the overcoat layer 122b, while the durability of the silver nanowire layer 123a may increase in the present of the overcoat layer 123b. Each of the silver nanowire layer 122a and the silver nanowire layer 123a may be electrically connected to a peripheral circuit (not shown), which may electrically connect the film-type sensor and an external circuit through a flexible printed circuit (FPC). The silver nanowire layer 122a and the silver nanowire layer 123a are electrically insulated from each other. In order to provide for a touch sensing function, the silver nanowire layer 122a receives a control signal from the external circuit, and the silver nanowire layer 123a transfers a sensing signal to the external circuit, and vice versa. The film-type sensor may be formed by the following steps. First, depositing a plurality of metal nanowires dispersed in a fluid on an upper surface of the thin film 121, including a strip coating process, a mesh coating process, a printing process, a lamination process or a roll-to-roll process (RTR), followed by drying the fluid to form a metal nanowire network layer on the thin film 121, and then patterning the metal nanowire network layer to form the first nano-metal conductive layer 122. Next, depositing a plurality of metal nanowires dispersed in a fluid on a bottom surface of the thin film 121, followed by drying the fluid to form a metal nanowire network layer on the thin film 121, and then patterning the metal nanowire network layer to form the second nano-metal conductive layer 123. Alternatively, the thin film 121 may be subjected to a surface pre-treatment process, such that the metal nanowires can be deposited on the thin film 121 with higher adhesion. The surface pre-treatment process of the thin film 121 may bring some advantages. For example, the metal nanowires can be evenly deposited and firmly affixed to the thin film 121. The overcoat layer may be formed of an optical transparent polymer matrix material, which includes but not limited to: polyacrylics, such as polymethacrylates (for example, poly (methyl methacrylate)), polyacrylates and polyacrylonitrile, poly(vinyl alcohol); polyester (for example, poly(ethylene terephthalate) (PET), poly(ethylene 2,6-naphthalate) and polycarbonate); high aromaticity polymer, such as phenol formaldehyde resin or cresol-formaldehyde; polystyrene; poly(vinyl toluene); polyvinyl xylene; polyimide; polyamide; polyamide-imide; poly(etherimide); polysulfide, polysulfone; poly(phenylene); polyphenylene ether; polyurethane (PU); epoxy; polyolefin (for example, polypropylene, polymethylpentene, and cycloalkene); acrylonitrile-butadiene-styrene copolymer (ABS); cellulose; silicone and other silicon-containing polymers (for example, polysilsesquioxanes and polysilanes); polyvinyl chloride (PVC); polyacetate; polynorbornene; synthetic rubber (for example, EPR, SBR, and EPDM); fluoropolymer (for example, polyvinylidene fluoride, polytetrafluoroethylene (TFE) or polyhexafluoropropylene); copolymer of fluoroolefins and hydrocarbon olefins, and amorphous fluorocarbon polymers or copolymers.

In one embodiment, film-type sensor further includes a hardcoat layer (HC) 170 disposed on the first nano-metal conductive layer 122, and a passivation layer or a protection layer such as a primer layer 130 disposed on the second nano-metal conductive layer 123. The hardcoat layer is referred to a coating layer for preventing scraping and abrasion and meanwhile providing a surface protection, including but not limited to: a synthetic polymer of polyacrylate, epoxy resin, polyurethane, polysilane, silicone, poly(silicon acrylate), and the like. Preferably, the hardcoat layer further includes colloidal silica. The hardcoat layer has a thickness of about 1 µm to 50 µm. The passivation layer is made of a flexible material, which includes but not limited to: polyester, polyethylene terephthalate (PET), polybutylene terephthalate, polymethyl methacrylate (PMMA), acrylic resin, polycarbonate (PC), polystyrene, triacetic acid ester (TAC), polyvinyl alcohol, polyvinyl chloride, polyvinylidene chloride, polyethylene, copolymer of ethylene and vinyl acetate, polyvinyl butyral, copolymer of metal ion, crosslinked ethylene and methacrylic acid, polyurethane, cellophane, polyolefin, and the like. Preferably, the passivation layer is made of PET, PC, PMMA or TAC having a higher mechanical strength. In one embodiment, film-type sensor may include a primer layer 130 disposed on the first nano-metal conductive layer 122 or the second nano-metal conductive layer 123. In other words, the passivation layer, the primer layer 130, and the hardcoat layer 170 can be formed on nano-metal layer alternatively, otherwise the passivation layer, the hardcoat layer 170, and the primer layer 130 can present together. In this way, the surface of the first nano-metal conductive layer 122 or the second nano-metal conductive layer 123 is protected from oxidation in the air, scraping and abrasion.

Figure 2C:
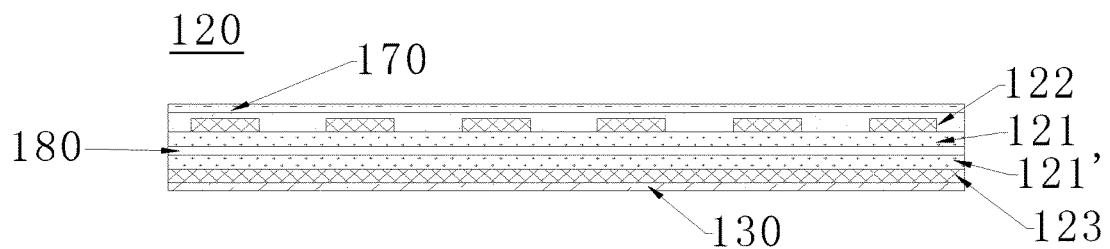

Referring to FIG. 2C. FIG. 2C is yet another structural view of a film-type sensor according to one embodiment of the disclosure. The film-type sensor i.e., the flexible touch sensing component 120 has two sub-sensors. One sub-sensor includes a first thin film 121, and a first nano-metal conductive layer 122, and the other sub-sensor includes a second thin film 121', and a second nano-metal conductive layer 123. The first nano-metal conductive layer 122 is disposed on the first thin film 121, while the second nano-metal conductive layer 123 is disposed on the second thin film 121'. The two sub-sensors are attached or adhered to each other so as to form the film-type sensor. The first nano-metal conductive layer 122 and the second nano-metal conductive layer 123 face in opposite directions while attaching the two sub-sensors. In one embodiment, the first nano-metal conductive layer 122 and the second nano-metal conductive layer 123 are attached together but are electrically insulted from each other. Alternatively, the first thin film 121 and the second thin film 121' are adhered together. Alternatively, the first nano-metal conductive layer 122 on the first thin film 121 and the second nano-metal conductive layer 123 on the second thin film 121' face in the same direction. In other words, the first nano-metal conductive layer 122 is formed on a first surface (for example, the upper surface) of the first thin film 121, and the second nano-metal conductive layer 123 is formed on a first surface (for example, the upper surface) of the second thin film 121', while the second nano-metal conductive layer 123 is attached on a second surface (for example, the bottom surface) of the first thin film 121 to form the film sensor. The film-type sensor may be formed by the following steps. First, depositing a plurality of metal nanowires dispersed in a fluid on the first thin film 121, including a strip coating process, a mesh coating process, a printing process, a lamination process or a roll-to-roll process (RTR), followed by drying the fluid to form a metal nanowire network layer on the first thin film 121, and then patterning the metal nanowire network layer to form the first nano-metal conductive layer 122 so as to construct a sub-sensor. Next, depositing a plurality of metal nanowires dispersed in a fluid on the second thin film 121', followed by drying the fluid to form a metal nanowire network layer on the second thin film 121', and then patterning the metal nanowire network layer to form the second nano-metal conductive layer 123 so as to form the other sub-sensor. The two sub-sensors are attached or adhered together subsequently through an adhesion layer 180. The adhesion layer 180 may be made of a transparent optical adhesive or hydrogel. In addition, the first thin film 121 and the second thin film 121' may be subjected to a surface pre-treatment process, such that the metal nanowires can be deposited on the first thin film 121 and the second thin film 121' with higher adhesion. The surface pre-treatment process of the first thin film 121 and the second thin film 121' may bring some advantages. For example, the metal nanowires can be evenly deposited and firmly affixed to the first thin film 121 and the second thin film 121'. The film-type sensor further includes a peripheral circuit (not shown) electrically connecting the first nano-metal conductive layer 122 and the second nano-metal conductive layer 123. The peripheral circuit may be electrically connected to an external circuit through a flexible printed circuit (FPC), such that the film-type sensor is electrically connected to the external circuit.

In one embodiment, the film-type sensor includes a hardcoat layer 170, passivation layer or a primer layer 130 on the first nano-metal conductive layer 122 or the second nano-metal conductive layer 123. The details of the hardcoat layer 170, the passivation layer and the primer layer 130 may be referred to the above-mentioned description.

In one embodiment of the present invention, the touch sensor further includes a flexible electrode component 124. The flexible electrode component 124 may be disposed on the flexible touch sensing component 120. Alternatively, the flexible electrode component 124 may be between the flexible touch sensing component 120 and the second release layer 140. The details of the touch sensor are described below.

Figure 2D:
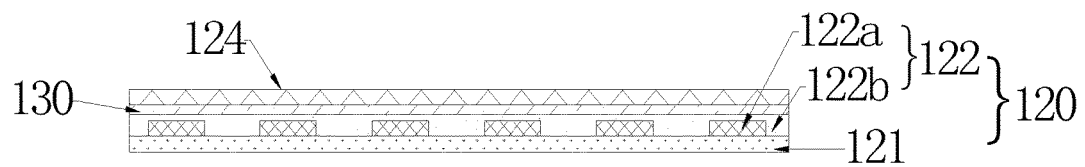

Referring to FIG. 2D. FIG. 2D is a structural view of a film-type sensor according to one embodiment of the disclosure. Comparing the structure of film-type sensor in FIG. 2A, the sensor shown in FIG. 2D further includes a flexible electrode component 124. With reference to FIG. 1E, the flexible electrode component 124 may be disposed in the flexible touch sensing component 120. Specifically, the flexible electrode component 124 is formed on the nano-metal conductive layer 122 of the flexible touch sensing component 120. Preferably, the flexible electrode component 124 and the nano-metal conductive layer 122 of the flexible touch sensing component 120 are electrically insulated from each other. For example, by forming an overcoat layer 122b interposed between the flexible electrode component 124 and the nano-metal conductive layer 122 of the flexible touch sensing component 120, the two electrodes 122 and 124 are electrically insulated from each other. Specifically, the overcoat layer 122b may have a desired thickness, such that the silver nanowire layer 122a is embedded in a lower portion of the overcoat layer 122b and extends along an in-plane direction (i.e., perpendicular to the through-thickness direction) and no nanowire or low-concentration nanowires distribute in an upper portion of the overcoat layer 122b. In this way, the nano-metal conductive layer 122 creates an in-plane conductivity (i.e., perpendicular to the through-thickness direction) without a conductivity parallel to the through-thickness direction. Therefore, there is no electrical current conducted between the nano-metal conductive layer 122 and the flexible electrode component 124. Alternatively, the flexible electrode component 124 and the nano-metal conductive layer 122 of the flexible touch sensing component 120 may be electrically insulated from each other by forming a primer layer 130 between electrodes 122 and 124. In other words, suitable insulating layers, such as a primer layer 130, a hardcoat layer, a passivation layer, an overcoat layer 122b or their combination may be used to electrically insulating the flexible electrode component 124 and the nano-metal conductive layer 122.

The flexible electrode component 124 is flexible or deformable, i.e., the flexible electrode component 124 may have a bent shape temporarily or permanently. The detailed description of the flexible electrode component 124 may refer to the flexible touch sensing component 120. In other words, the flexible electrode component 124 may have a thin film 121 and a nano-metal conductive layer 122 formed on the thin film 121 as well. The nano-metal conductive layer 122 includes a metal nanowire layer, such as a silver nanowire layer 122a and an overcoat layer 122b. Preferably, the nano-metal conductive layer 122 further includes a passivation layer, a primer layer 130, or a hardcoat layer thereon. In one embodiment, the nano-metal conductive layer 122 of the flexible electrode component 124 may not be patterned (such as an etching step). Therefore, the nano-metal conductive layer 122 of the flexible electrode component 124 can be coated entirely on the sesnor. In this way, the flexible electrode component 124 may perform as an electrode layer for shielding electrical signals, thereby preventing from electromagnetic interference (EMI) and further enhancing the ratio of signal to noise. Alternatively, the nano-metal conductive layer 122 of the flexible electrode component 124 may be patterned (for example, by an etching step), and thereby having a sensing function, such as sensing the capacitance variation, pressure, or the morphology of the surface of the object being sensing. In addition, in one embodiment, the flexible electrode component 124 can be fabricated by the manufacturing method of the film-type sensor provided above. For example, firstly disposing the thin film 121 on the primer layer 130, as shown in FIG. 2D, followed by sequentially forming the silver nanowire layer 122a and the overcoat layer 122b to form the flexible electrode component 124. Alternatively, directly forming the silver nanowire layer 122a and the overcoat layer 122b on the primer layer 130 referring to the method provided above to form the flexible electrode component 124. Alternatively, sequentially forming the thin film 121, the silver nanowire layer 122a, and the overcoat layer 122b directly on the overcoat layer 122b of the flexible touch sensing component 120 referring to the method provided above to form the flexible electrode component 124. Alternatively, sequentially forming the silver nanowire layer 122a and the overcoat layer 122b directly on the overcoat layer 122b of the flexible touch sensing component 120 referring to the method provided above to form the flexible electrode component 124.

The flexible electrode component 124 may also be a thin film electrode component having a thin film and a transferable transparent conductive film attached or adhered to the thin film. In one embodiment, the thin film may be firstly disposed on the primer layer 130 in FIG. 2D, and then the transferable transparent conductive film is adhered to the thin film. Alternatively, the transferable transparent conductive film is directly adhered to the primer layer 130 in FIG. 2D so as to form the flexible electrode component 124. Alternatively, attaching the transferable transparent conductive film directly on the overcoat layer 122b of the flexible touch sensing component 120 to form the flexible electrode component 124. Still alternatively, sequentially attaching the thin film and the transferable transparent conductive film directly on the overcoat layer 122b of the flexible touch sensing component 120 to form the flexible electrode component 124.

In one embodiment, the flexible electrode component 124 may be disposed between the flexible touch sensing component 120 and the second release layer 140. For example, the flexible electrode component 124 is formed on the thin film 121 of the flexible touch sensing component 120. The nano-metal conductive layer 122 of the flexible touch sensing component 120 is formed on the first surface (for example, the upper surface) of the thin film 121 of the flexible touch sensing component 120, whereas the flexible electrode component 124 is formed on the second surface (for example, the bottom surface) of the thin film 121 of the flexible touch sensing component 120. The flexible electrode component 124 is interposed between the second release layer 140 and the thin film 121 of the flexible touch sensing component 120. In one embodiment, the flexible electrode component 124 may be fabricated referring to the manufacturing method of the film sensor. For example, the thin film 121 of the flexible electrode component 124 is firstly formed on the bottom surface of the thin film 121 of the flexible touch sensing component 120, and then the silver nanowire layer 122a and the overcoat layer 122b are formed on the thin film 121 of the flexible electrode component 124, so as to form the flexible electrode component 124. Alternatively, the silver nanowire layer 122a and the overcoat layer 122b are sequentially and directly formed on the bottom surface of the thin film 121 of the flexible touch sensing component 120 referring to the method provided above so as to form flexible electrode component 124. The flexible electrode component 124 may also be a thin film electrode component at least having a transferable transparent conductive film. The thin film electrode component may be formed between the flexible touch sensing component 120 and the second release layer 140 by the above-mentioned method.

Figure 2E:
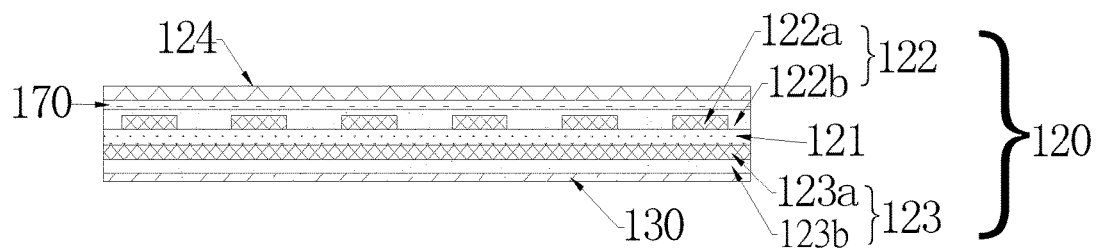

Referring to FIG. 2E. FIG. 2E is a structural view of a film-type sensor according to one embodiment of the disclosure. Comparing the structure shown in FIG. 2B, that the sensor shown in FIG. 2E further includes a flexible electrode component 124. Referring to FIG. 1E as well, in one embodiment, the flexible electrode component 124 may be disposed on the flexible touch sensing component 120. Specifically, the flexible electrode component 124 is formed on the first nano-metal conductive layer 122. The flexible electrode component 124 and the first nano-metal conductive layer 122 may be electrically insulated from each other by an insulating layer, such as a hardcoat layer 170 that is disposed between the flexible electrode component 124 and the first nano-metal conductive layer 122. The hardcoat layer 170 may be replaced by or combined with a barrier layer or a primer layer 130.

Alternatively, the flexible electrode component 124 may be disposed between the flexible touch sensing component 120 and the second release layer 140. For example, the flexible electrode component 124 is formed between the second nano-metal conductive layer 123 and the second release layer 140. Preferably, the flexible electrode component 124 and the second nano-metal conductive layer 123 may be made electrically insulated from each other by an insulating layer, such as a primer layer 130 between the flexible electrode component 124 and the second nano-metal conductive layer 123. The primer layer 130 may be replaced by or combined with a hardcoat layer or a barrier layer. The details of the embodiment of FIG. 2E may refer to those methods provided above, and therefore are not repeated herein.

Figure 2F:
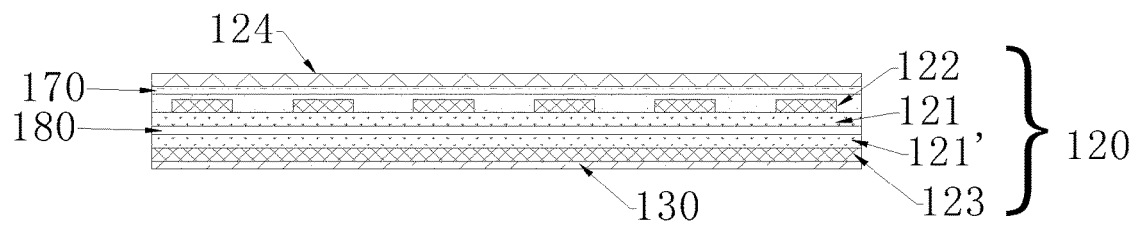

Referring to FIG. 2F. FIG. 2F is a structural view of a film-type sensor according to one embodiment of the disclosure. Comparing the structure shown in FIG. 2C, the sensor in FIG. 2F further includes a flexible electrode component 124. Referring to FIG. 1E as well, in one embodiment, the flexible electrode component 124 is disposed on the flexible touch sensing component 120. Specifically, the flexible electrode component 124 is disposed over the first nano-metal conductive layer 122, which is disposed on the first thin film 121. The flexible electrode component 124 and the first nano-metal conductive layer 122 are electrically insulated from each other. For example, the flexible electrode component 124 and the first nano-metal conductive layer 122 may be made electrically insulated from each other by an insulating layer, such as a hardcoat layer 170 between the flexible electrode component 124 and the first nano-metal conductive layer 122. The hardcoat layer 170 may be replaced by or combined with a barrier layer or a primer layer.

Alternatively, the flexible electrode component 124 may be disposed between the flexible touch sensing component 120 and the second release layer 140. For example, the flexible electrode component 124 is formed on the upper surface of the second thin film 121' (i.e., the surface opposite to a surface where the second nano-metal conductive layer 123 is formed). In other words, the flexible electrode component 124 and the second nano-metal conductive layer 123 are respectively disposed on opposite surfaces of the second thin film 121'. Alternatively, the flexible electrode component 124 may be formed on the second nano-metal conductive layer 123. Preferably, the flexible electrode component 124 and the second nano-metal conductive layer 123 may be made electrically insulated from each other by an insulating layer, such as a primer layer 130 between the flexible electrode component 124 and the second nano-metal conductive layer 123. The primer layer 130 may be replaced by or combined with a hardcoat layer 170 or a barrier layer. The details of the embodiment of FIG. 2F may refer to the methods provided above, and therefore are not repeated herein.

Figure 3A:
FIGS. 3A~3F show steps of a manufacturing method of a touch sensor according to yet another embodiment of the disclosure.
Figure 3B:
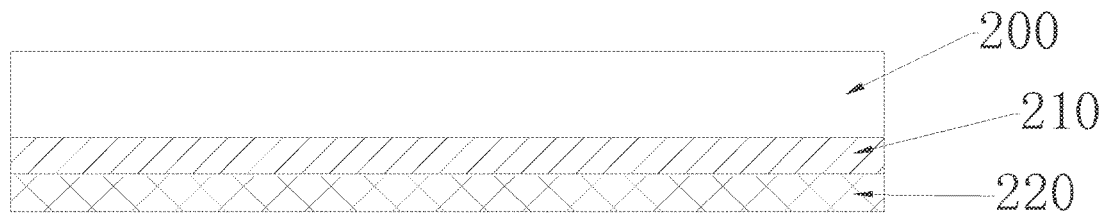
Figure 3C:
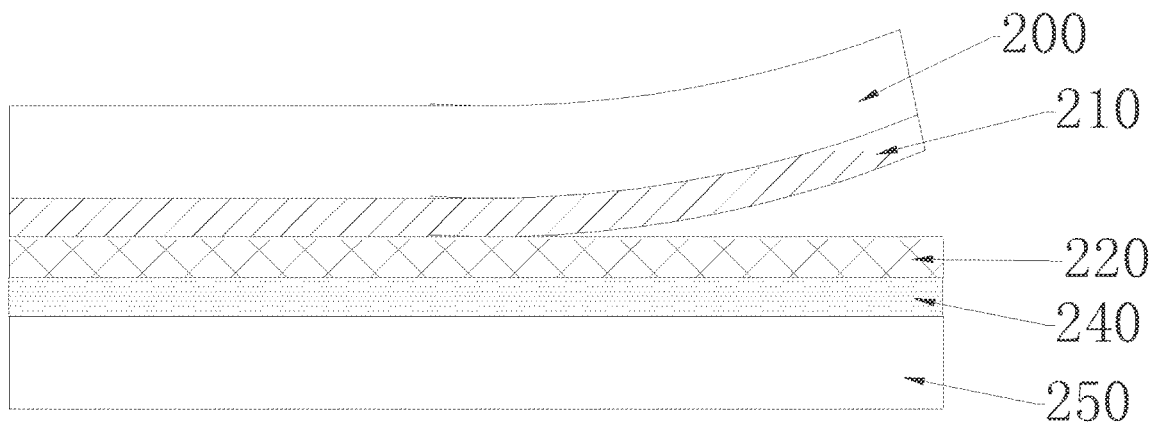
Figure 3D:
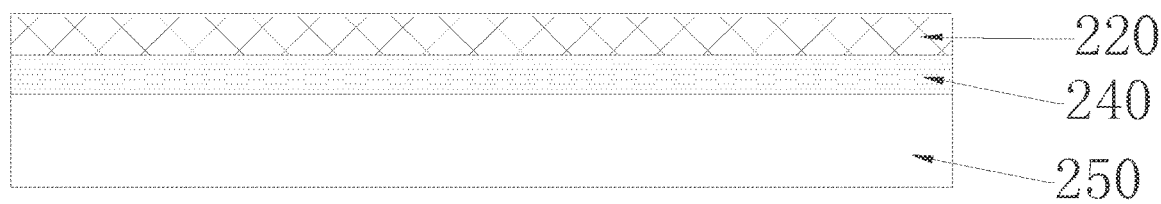
Figure 3E:
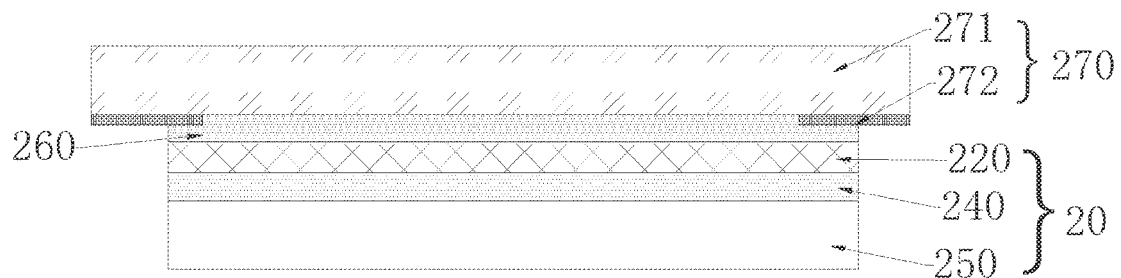
Figure 3F:
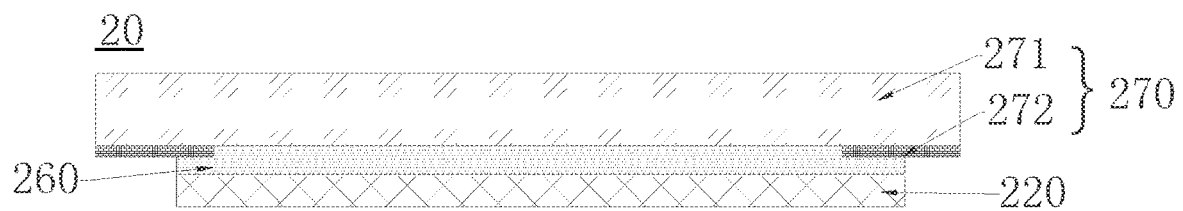
Figure 3G:
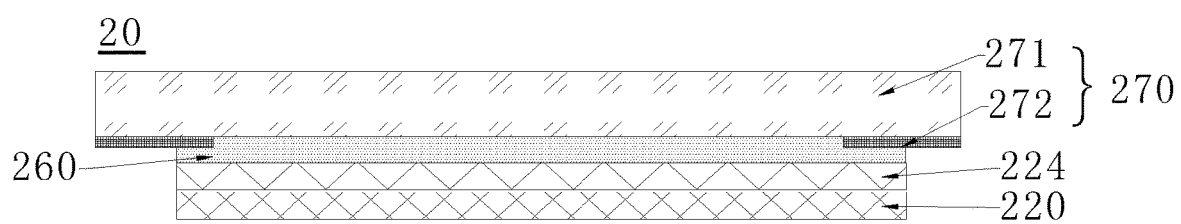
FIG. 3G is a structural view of a touch panel according to another embodiment of the disclosure.

In one embodiment, the touch sensor further includes a bonding layer, e.g., the bonding layer 260 shown in FIG. 3G, and a flexible electrode component 124 may be disposed between the flexible touch sensing component 120 and the bonding layer. In other words, the bonding layer and the flexible electrode component 124 may have proper combinations and arrangements, with details provided below.

FIGS. 3A~3F shows steps of a manufacturing method of a touch sensor according to the disclosure. FIG. 3F is also a structural view of a touch panel formed by a manufacturing method the disclosure.

Referring to FIG. 3A. First, a first substrate 200 is provided, and a first release layer 210 is formed on the first substrate 200. The first substrate 200 may serve as a mechanical support for the structure formed in the subsequent steps, and the first substrate 200 is a temporary platform where a touch panel 20 is manufactured thereon. The touch panel 20 may be removed from the first substrate 200 when needed. The first substrate 200 may be made of a transparent insulating material or an opaque insulating material, such as a glass substrate or a sapphire substrate. The first substrate 200 may be a flexible substrate. As the first substrate 200 is not a part of the final touch panel 20, therefore the first substrate 200 can be made of a relatively low cost material as long as it provides the necessary mechanical support. For example, in order to reduce the manufacturing cost of the touch panel 20, the first substrate 200 may be made of a row-material glass instead of a chemically strengthened glass. In addition, the details of the first substrate 200 may be referred to the description of the first substrate 100. The first release layer 210 is similar with the first release layer 110 and therefore the details are not repeated herein.

Next, referring to FIG. 3B, a flexible touch sensing component 220 is formed on the first release layer 210, and the first release layer 210 is interposed between the first substrate 200 and the flexible touch sensing component 220. The flexible touch sensing component 220 is a film-type sensor which includes a thin film and a transferable transparent conductive film adhered to the thin film. The film-type sensor is flexible or deformable, that is, the film-type sensor may have a bent shape temporarily or permanently. The film-type sensor in the present embodiment and the film-type sensor described in the previous embodiments may have the same structure or property. In other words, the film-type sensor described in the previous embodiments may be implemented in the present embodiment, and the details therefore are not repeated herein.

Next, referring to FIG. 3C, a second substrate 250 is formed over the flexible touch sensing component 220. A second release layer 240 is interposed between the flexible touch sensing component 220 and the second substrate 250. The second release layer 240 and the first release layer 210 are made of a thin film layer having a releasable ability. However, the chemical compositions of the second release layer 240 and the first release layer 210 can be the same or different. The second substrate 250 and the first substrate 200 may be made of the same material or different materials.

Next, referring to FIG. 3D, the first substrate 200 is removed by releasing the first release layer 210. The first substrate 200 is removed, and thus the touch panel 20 can be transferred onto a desired target substrate. The releasing step may refer to the above-mentioned releasing step, and the details therefore are not repeated herein.

Next, referring to FIG. 3E, a decorative flexible cover 270 is adhered to the flexible touch sensing component 220 by using a bonding layer 260. The decorative flexible cover 270 may refer to a plate having decoration/shielding functions. For example, a color ink is printed on the plate to provide for the decoration/shielding functions. The bonding layer 260 is interposed between the decorative flexible cover 270 and the flexible touch sensing component 220. In other words, the decorative flexible cover 270 serves a target substrate, and the processed touch sensor 20 is transferred onto the decorative flexible cover 270 after the first substrate 200 is removed from the touch sensor 20. The decorative flexible cover 270 and the flexible touch sensing component 220 are attached or adhered to each other by firstly adhering the bonding layer 260 on the decorative flexible cover 270, followed by adhering the decorative flexible cover 270 that has the bonding layer 260 to the flexible touch sensing component 220. The bonding layer 260 may be made of a layer of reactive inks, an optical adhesive layer or a layer of hydrogel. In one embodiment, the decorative flexible cover 270 and the flexible touch sensing component 220 are adhered to each other by the following steps. First, forming the bonding layer 260 between the flexible touch sensing component 220 and the first release layer 210 is performed. Then, in the releasing step, the first substrate 200 and the first release layer 210 are removed simultaneously, so that the bonding layer 260 is exposed. Accordingly, the processed touch sensor 20 with the exposed bonding layer 260 can be adhered with the decorative flexible cover 270. Preferably, the stickiness of the reactive ink layer is unaffected by the removal of the first release layer 210 from the reactive ink layer, therefore the processed touch sensor 20 with the exposed bonding layer 260 can be directly adhered to a desired target substrate without adding an extra optical adhesive layer or hydrogel after the releasing step. In this way, the product of touch panels can be lightweight, thin and meanwhile have good optical properties, such as high transmittance. In a structure of one embodiment, the decorative flexible cover 270 includes a thin film layer 271 and a shielding layer 272 disposed on the thin film layer 271. The shielding layer 272 is disposed on at least one side of the thin film layer 271 so as to shield the peripheral circuit, such that the signal wires located on the peripheral area are not easily seen by the user from the viewing site of the devices. In one embodiment, the shielding layer 272 is disposed on the bottom surface of the thin film layer 271. That is, the surface of the thin film layer 271 where the shielding layer 272 is disposed thereon is near to the flexible touch sensing component 220. In one other embodiment, the shielding layer 272 may be disposed on the upper surface of the thin film layer 271. That is, the surface of the thin film layer 271 where the shielding layer 272 is disposed thereon is opposite to the flexible touch sensing component 220. Alternatively, in one other embodiment, the shielding layer 272 may be a deco-film. The deco-film, for example, includes a transparent thin film and a shielding ink printed on the transparent thin film to define a peripheral area. The deco-film is directly disposed on the upper surface of the decorative flexible cover 270. The shielding layer 272 may be made of a colored ink, a colored photoresist or a combination thereof. The shielding layer 272 may have a single-layered structure or a composite laminated structure. For example, the single-layered structure is a black ink layer, while the composite laminated structure is a stacked structure of an ink layer and a photoresist layer, a stacked structure of a white ink layer and a black ink layer, or a stacked structure of a white ink layer, a black ink layer, and a photoresist layer. The decorative flexible cover 270 may have a non-planar shape, such as a curved shape. The decorative flexible cover 270 is stretchable or is deformable. The decorative flexible cover 270 may be temporarily formed into a curved surface or a non-curved surface. The decorative flexible cover 270 may be made of a flexible material such as plastics or resin, including but not limited to polycarbonate (PC), poly(m-ethyl methacrylate) (PMMA), polyethylene terephthalate (PET), polyethersulfone (PES), polyimide (PI), cellulose ester, benzocyclobutene (BCB), polyvinyl chloride (PVC), acrylic resin, and the like.

Next, referring to FIG. 3F, the second substrate 250 is removed by releasing the second release layer 240. The details of this second releasing step may refer to the description of the first releasing step. For example, the second substrate 250 may be removed by a chemical etching process using a chemical such as hydrogen fluoride in the step of releasing the second substrate 250. Alternatively, the second substrate 250 may be removed by a mechanical process, such as a vibration or a combination of chemical processes and mechanical processes. Preferably, the second substrate 250 and the second release layer 240 are removed simultaneously, such that the touch-sensing product of the disclosure can keep lightweight, thin and meanwhile have good optical properties, such as high transmittance.

FIG. 3F shows a product of a touch panel formed through the steps described above. The upper side of FIG. 3F represents the touching site and viewing site of touch panel for the user. The touch panel 20 includes, from top to bottom, the decorative flexible cover 270, the bonding layer 260, and the flexible touch sensing component 220. The details of the structure, material and manufacturing method of each component are described above, and therefore are not repeated herein. The touch panel 20 can be used in touch display devices, such as computer system, mobile phone, digital media player, tablet computer, ultra-thin laptop, wearable touch devices, in-vehicle touch monitor, and the like.

In one embodiment of the present invention, the touch panel 20 further includes a flexible electrode component 224. The flexible electrode component 224 may be disposed on the flexible touch sensing component 220. Alternatively, the flexible electrode component 224 may be disposed between the flexible touch sensing component 220 and the bonding layer 260. The details of the touch panel 20 having the flexible electrode component 224 are provided below.

FIG. 3G is a structural view of a touch panel 20 having the flexible electrode component 224 formed by a manufacturing method according to one embodiment of the disclosure. In one embodiment, the touch panel 20 further includes a flexible electrode component 224. The flexible electrode component 224 may be disposed between the flexible touch sensing component 220 and the bonding layer 260. The flexible electrode component 224 and the flexible touch sensing component 220 are electrically insulated from each other. The structure and fabricating method of the flexible electrode component 224 have been described above, and therefore are not repeated herein. The flexible electrode component 224 connects to ground or a reference potential so as to perform as an electrode layer for shielding the electrical signal. The decorative flexible cover 270 would perform as the interface where the user touches the device after the touch panel 20 of the disclosure has been assembled with a display module (not shown), and the flexible electrode component 224 may interpose between the flexible touch sensing component 220 and the external environment. Therefore, the electromagnetic interference caused by the noise of the external environment to the touch sensing module may be prevented.

Figure 3H:
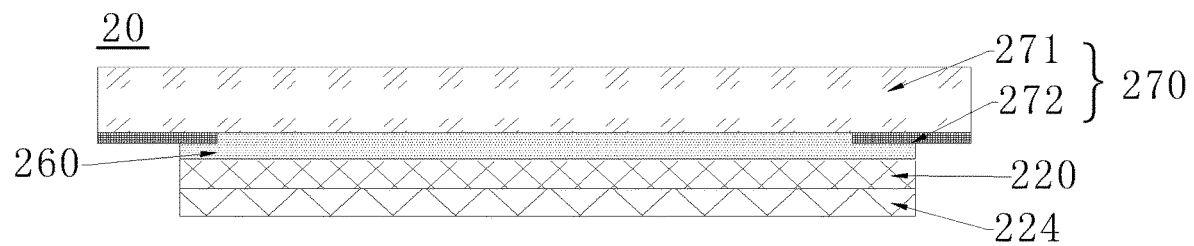
FIG. 3H is a structural view of a touch panel according to still another embodiment of the disclosure.

FIG. 3H is another structural view of a touch panel 20 having the flexible electrode component 224 according to one embodiment of the disclosure. In one embodiment, the touch panel 20 further includes a flexible electrode component 224 disposed on the bottom surface of flexible touch sensing component 220. In other words, the flexible touch sensing component 220 is between the flexible electrode component 224 and the bonding layer 260. The flexible electrode component 224 connects to ground or a reference potential so as to perform as an electrode layer for shielding the electrical signal. The flexible electrode component 224 would be located between a display module (not shown) and the flexible touch sensing component 220 after the touch panel 20 of the disclosure has been assembled with the display module. Accordingly, the electromagnetic interference between the display module and the touch sensing module may be prevented.

In another embodiment, the flexible electrode component 224 is disposed on both of the upper surface and the bottom surface of the flexible touch sensing component 220. Therefore, the electromagnetic interference caused by the noise of the external environment to the touch sensing module may be prevented by the flexible electrode component 224, and the electromagnetic interference between the display module and the touch sensing module may be prevented by the flexible electrode component 224 as well.

Figure 4A:
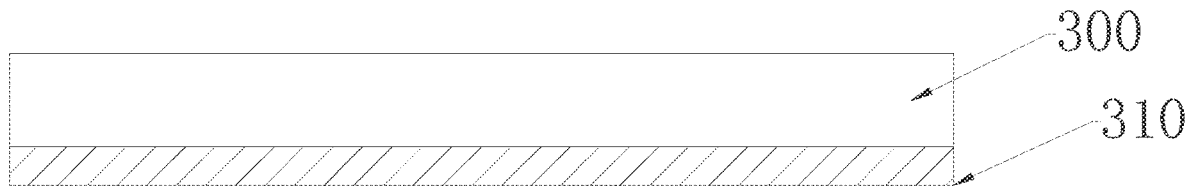
FIGS. 4A~4F show steps of a manufacturing method of a touch panel according to yet another embodiment of the disclosure.
Figure 4B:
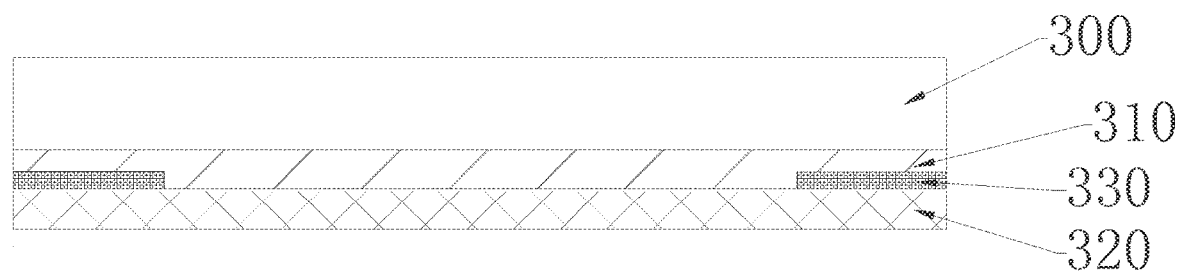
Figure 4C:
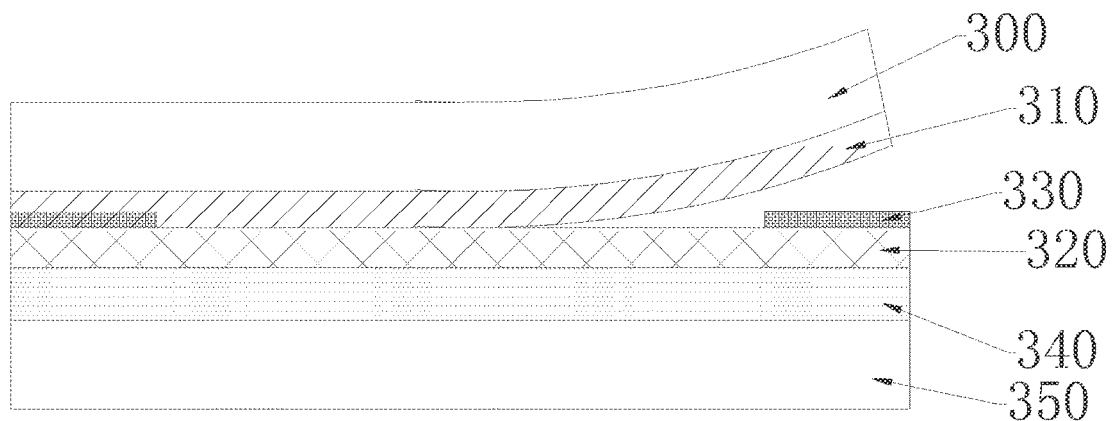
Figure 4D:
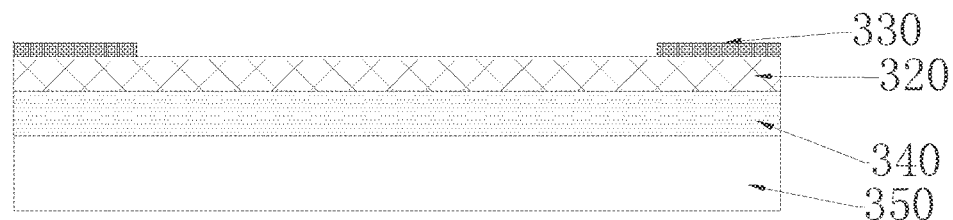
Figure 4E:
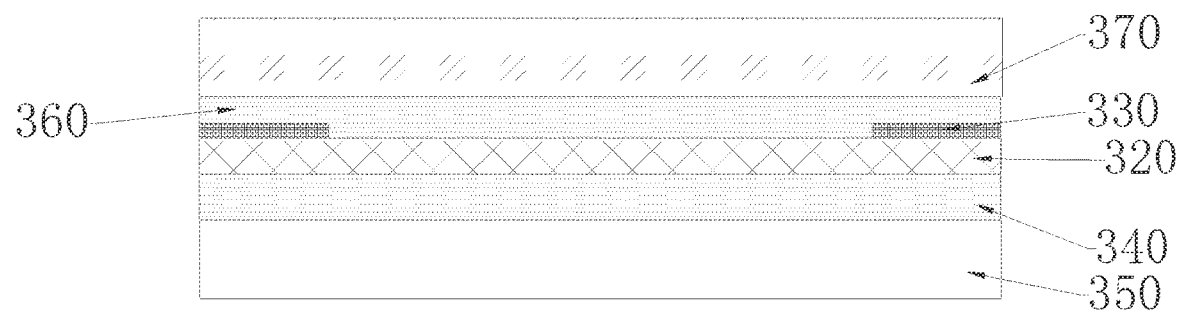
Figure 4F:
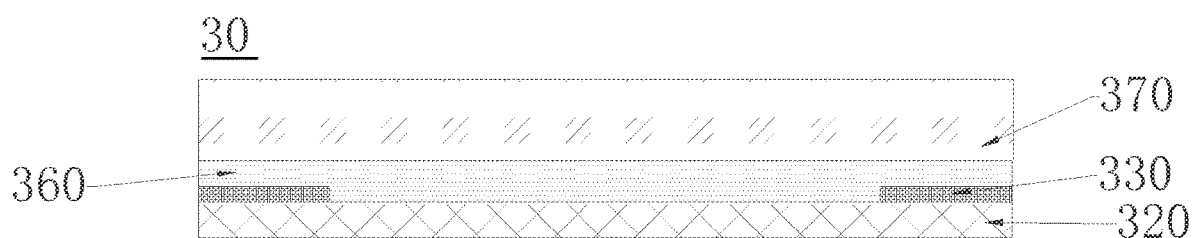

FIGS. 4A-4F are shows steps of a manufacturing method of a touch sensor according to the disclosure. FIG. 4F is also a structural view of a touch panel formed by a manufacturing method of the disclosure.

Referring to FIG. 4A. First, a first substrate 300 is provided, and a first release layer 310 is formed on the first substrate 300. The details of the first substrate 300 may refer to the above-mentioned description of substrate 100 or 200. The first release layer 310 is a thin film layer and the details of the first release layer 310 may refer to the above-mentioned description of release layer 110 or 210. Therefore, the contents of substrate 300 and release layer 310 are not repeated herein.

Next, referring to FIG. 4B, a flexible touch sensing component 320 and a shielding layer 330 are formed on the first release layer 310. The shielding layer 330 covers at least a portion of the substrate 300 to define a peripheral area, and the flexible touch sensing component 320 is substantially formed on the display area. Preferably, the shielding layer 330 covers and shields the peripheral circuits connected with the touch sensing electrodes, such that the signal wires (e.g., the peripheral circuits) are not easily seen by the user. In one embodiment, the shielding layer 330 is integrated with the flexible touch sensing component 320. For example, the shielding layer 330 is formed of a colored material printed on the flexible touch sensing component 220. In other words, the shielding layer 330 and the flexible touch sensing component 320 are integrated as a component. The shielding layer 330 may be made of a colored ink, a colored photoresist or a combination thereof. The shielding layer 330 is a colored material layer printed on the flexible touch sensing component 220, and may have a single-layered structure or a composite laminated structure. For example, the single-layered structure is a black ink layer, while the composite laminated structure is a stacked structure of an ink layer and a photoresist layer, a stacked structure of a white ink layer and a black ink layer, or a stacked structure of a white ink layer, a black ink layer, and a photoresist layer. Alternatively, in other embodiments, the shielding layer 330 may be a deco-film. The deco-film, for example, includes a transparent thin film, and a shielding ink printed on the transparent thin film to define a peripheral area. The deco-film may be directly disposed on the upper surface of the flexible touch sensing component 320. The flexible touch sensing component 320 is a film-type sensor having a thin film and a transferable transparent conductive film adhered to the thin film. The film-type sensor is stretchable, flexible or deformable. In other words, the film-type sensor may be temporarily or permanently formed into a curved surface. The film-type sensor in the present embodiment and the film sensors described in the previous embodiments may have the same structure. In other words, the film sensors described in the previous embodiments may be implemented in the present embodiment, and therefore are not repeated herein.

Next, referring to FIG. 4C, a second substrate 350 is formed on the flexible touch sensing component 320, and a second release layer 340 is interposed between the flexible touch sensing component 320 and the second substrate 350. The second release layer 340 and the first release layer 310 are made of a thin film layer having a releasable ability. However, the chemical compositions of the second release layer 340 and the first release layer 310 can be the same or different. The second substrate 350 and the first substrate 300 may be made of the same material or difference materials. The second substrate 350 may be removed by releasing the second release layer 340 when needed Next, referring to FIG. 4D, the first substrate 300 is removed by releasing the first release layer 310. The first substrate 300 is removed, such that the touch panel 30 can be transferred onto a desired target substrate. The releasing step may refer to the above-mentioned releasing step, and the details therefore are not repeated herein.

Next, referring to FIG. 4E, a flexible cover 370 is adhered to the flexible touch sensing component 320 by using a bonding layer 360. The bonding layer 360 is interposed between the flexible cover 370 and the flexible touch sensing component 320. In other words, the flexible cover 370 serves as a target substrate, and the processed touch sensor 30 is transferred onto the flexible cover 370 after the first substrate 300 has been removed. The flexible cover 370 and the flexible touch sensing component 320 are adhered to each other by the following steps. First, adhering the bonding layer 360 to the flexible cover 370 is performed, followed by adhering the flexible cover 370 with the bonding layer 360 to the integrated flexible touch sensing component 320 and shielding layer 330. The bonding layer 360 may be made of a layer of reactive inks, a optical-clear adhesive layer or a layer of hydrogel. In one embodiment, the flexible cover 370 and the flexible touch sensing component 320 are adhered to each other by the following steps. First, forming the bonding layer 360 between the flexible touch sensing component 320 and the first release layer 310 is performed. Then, in the releasing step, the first substrate 300 and the first release layer 310 are removed simultaneously, so that the bonding layer 360 is exposed. Accordingly, the processed touch panel 30 with the exposed bonding layer 360 can be adhered to the flexible cover 370. Preferably, the stickiness of the reactive ink layer is unaffected by the removal of the first release layer 310 from the reactive ink layer, therefore the processed touch sensor 30 with the exposed bonding layer 360 can be directly adhered to a desired target substrate without any additional optical adhesive layer or hydrogel after the releasing step. In this way, the product of touch panel can be lightweight, thin and meanwhile have good optical properties, such as high transmittance. The flexible cover 370 may have a curved shaped or a non-curved surface. The flexible cover 370 is deformable. The flexible cover 370 may be permanently formed into a curved surface. Alternatively, the flexible cover 370 may be temporarily formed into a curved surface or a non-curved surface. The flexible cover 370 may be made of a flexible material such as plastics or resin, including but not limited to polycarbonate (PC), poly(methyl methacrylate) (PMMA), polyethylene terephthalate (PET), polyethersulfone (PES), polyimide (PI), cellulose ester, benzocyclobutene (BCB), polyvinyl chloride (PVC), acrylic resin, and the like.

Next, referring to FIG. 4F, the second substrate 350 is removed by releasing the second release layer 340. The second substrate 350 may be removed by a chemical etching process, for example a chemical such as hydrogen fluoride in the step of releasing the second release layer 340. Alternatively, the second substrate 350 may be removed by a mechanical process, such as a vibration or a combination of chemical processes and mechanical processes. Preferably, the second substrate 350 and the second release layer 340 are removed simultaneously. Alternatively, the second release layer 340 are partially remained on the bottom surface of the flexible touch sensing component 320.

FIG. 4F shows a product of touch panel fabricated through the steps described above. The upper side of FIG. 4F represents the touching site and viewing site of touch panel for the user. The touch panel 30 includes, from top to bottom, the flexible cover 370, the bonding layer 360, a shielding layer 330 and a flexible touch sensing component 320. The shielding layer 330, in one embodiment, covers at least a portion of the flexible touch sensing component 320, for example, the end portions of the touch sensing electrodes, which connect with the peripheral circuits, are covered by the shielding layer 330. The flexible touch sensing component 320 is exposed after the second releasing step. For example, the bottom surface of flexible touch sensing component 320 is exposed after the second releasing step, and therefore the touch panel 30 can be assembled with a display module (not shown). The details of the structure, materials, manufacturing methods of each component is described above, and therefore is not repeated herein. The touch panel 30 can be used in touch display devices, such as computer system, mobile phone, digital media player, tablet computer, ultra-thin laptop, wearable touch devices, in-vehicle touch monitor, and the like.

In one embodiment of the present invention, the touch panel 30 further includes a flexible electrode component 324. The flexible electrode component 324 may be disposed on the flexible touch sensing component 320. Alternatively, the flexible electrode component 224 may be disposed between the flexible touch sensing component 320 and the bonding layer 360. The details of the touch panel 30 with the flexible electrode component 324 are provided below.

Figure 4G:
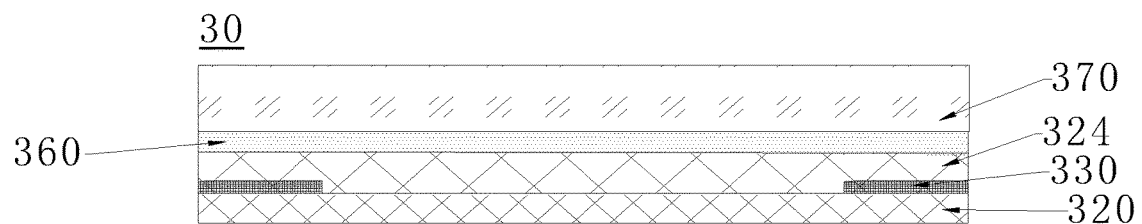
FIG. 4G is a structural view of a touch panel according to one embodiment of the disclosure.

FIG. 4G is one structural view of the touch panel 30 with the flexible electrode component 324 according to one embodiment of the disclosure. In one embodiment, the touch panel 30 further includes the flexible electrode component 324 which may be disposed between the flexible touch sensing component 320 and the bonding layer 360. In the present embodiment, the shielding layer 330 is a colored material layer printed on the flexible electrode component 324. The flexible electrode component 324 with the shielding layer 330 printed thereon is adhered to the flexible touch sensing component 320. The description of the shielding layer 330 has been provided above. Alternatively, the shielding layer 330 is a colored material layer printed on the flexible touch sensing component 320. The flexible touch sensing component 320 with the shielding layer 330 printed thereon is adhered to the flexible electrode component 324, such that the shielding layer 330 is formed between the flexible touch sensing component 320 and the flexible electrode component 324. Next, the bonding layer 360 is adhered to the flexible cover 370, followed by adhering the flexible cover 370 that has the bonding layer 360 adhered thereon to the flexible electrode component 324. Alternatively, the bonding layer 360 is disposed between the flexible touch sensing component 320 and the first release layer 310. Specifically, the bonding layer 360 is disposed on the flexible electrode component 324 and is below the first release layer 310, and the first release layer 310 is then removed to expose the bonding layer 360, followed by adhering the flexible cover 370 to the exposed bonding layer 360, and thus forming the touch panel 30 as shown in FIG. 4G.

In one embodiment, the shielding layer 330 is printed on the upper surface of the flexible electrode component 324, and then the flexible touch sensing component 320 is adhered to the bottom surface of the flexible electrode component 324 having the shielding layer 330. In this way, the bonding layer 360 is adhered to the flexible cover 370, and then the flexible cover 370, which has the bonding layer 360 adhered thereon, is adhered to the flexible electrode component 324 and the shielding layer 330. Alternatively, the bonding layer 360 is disposed between the flexible touch sensing component 320 and the first release layer 310. Specifically, the bonding layer 360 is disposed on the flexible electrode component 324 and the shielding layer 330, and is below the first release layer 310. The first release layer 310 is then removed to expose the bonding layer 360, followed by adhering the flexible cover 370 to the exposed bonding layer 360 to form the touch panel 30.

The flexible electrode component 324 serves as an electrode layer for shielding the electrical signal. The flexible cover 370 would be the interface where the user touches the device after the touch panel 30 of the disclosure is assembled with a display module (not shown), and the flexible electrode component 324 may interpose between flexible touch sensing component 320 and the external environment. Therefore, the electromagnetic interference caused by the noise of the external environment to the touch sensing module is prevented.

Figure 4H:
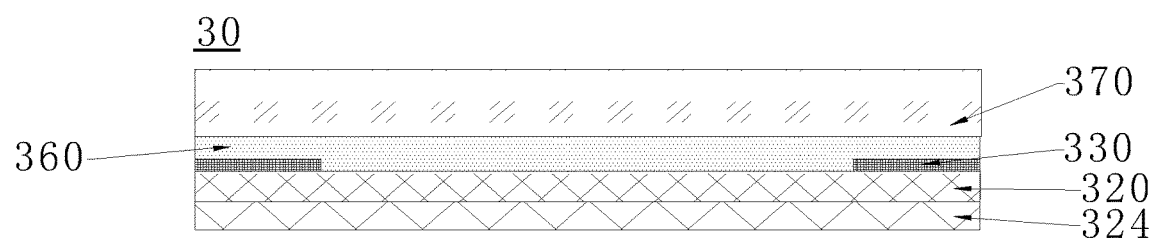
FIG. 4H is a structural view of a touch panel according to another embodiment of the disclosure.

FIG. 4H is another structural view of the touch panel 30 having the flexible electrode component 324 according to one embodiment of the disclosure. In one embodiment, the touch panel 30 further includes a flexible electrode component 324. The flexible electrode component 324 may be disposed on the bottom surface of flexible touch sensing component 320. In other words, the flexible touch sensing component 320 is between the flexible electrode component 324 and the bonding layer 360. Specifically, the flexible electrode component 324 may be formed between the flexible touch sensing component 320 and the second release layer 340. The flexible electrode component 324 is exposed after releasing the second release layer 340 and the second substrate 350 (i.e., the second releasing step), such that the exposed flexible electrode component 324 can be assembled with a display module (not shown). Alternatively, the second release layer 340 is partially remained on the flexible electrode component 324 after the releasing step, and the remained second release layer 340 may be used for attaching the display module and the manufactured touch panel of the disclosure.

The flexible electrode component 324 serves as an electrode layer for shielding the electrical signal as well as the flexible electrode component 224. The flexible electrode component 324 is interposed between a display module (not shown) and the flexible touch sensing component 320 for preventing electromagnetic interference from the display module and the touch sensing module.

In another embodiment, the flexible electrode component 324 is disposed on both of the upper surface and the bottom surface of the flexible touch sensing component 320 for shielding the electromagnetic interference caused by the noise of the external environment and shielding the electromagnetic interference between the display module and the touch sensing module as well.

It is understood that, the structures and manufacturing methods of the flexible touch sensing component 320 of the touch panel 30 as shown in FIGS. 4F~4H may refer to those of the flexible touch sensing component 120 or 220 provided above. For example, by combining the structure of the flexible touch sensing component 120 as shown in FIG. 2D and the structure of the touch panel 30, it is understood that the shielding layer 330 may be formed on the surface of nano-metal conductive layer 122, and then the flexible electrode component 124 (324) is adhered to the nano-metal conductive layer 122 of the flexible touch sensing component 120.

Figure 5A:
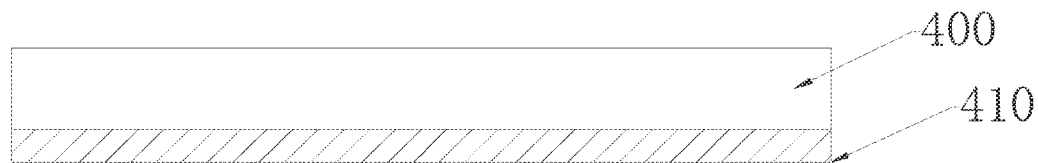
FIGS. 5A~5F show steps of a manufacturing method of a touch sensor according to yet another embodiment of the disclosure.
Figure 5B:
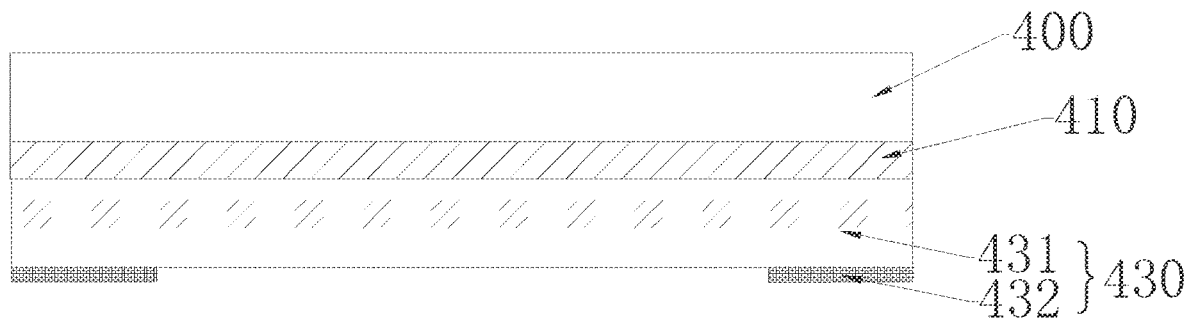
Figure 5C:
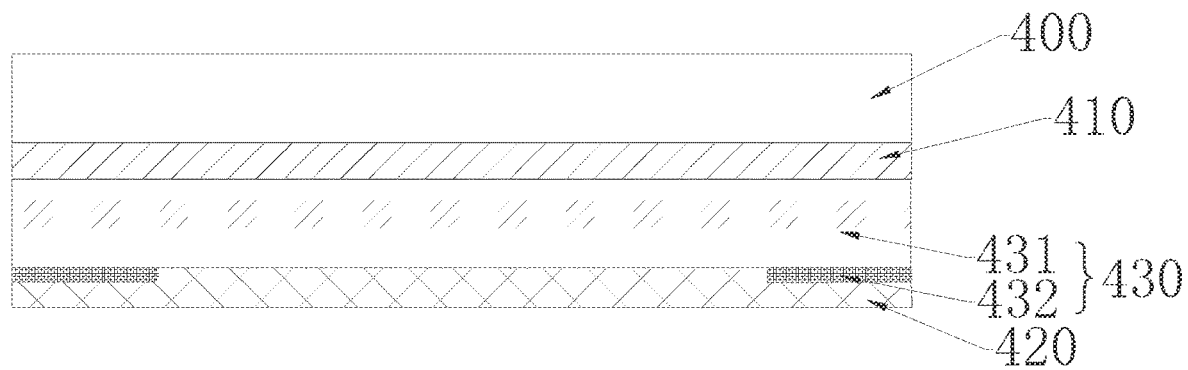
Figure 5D:
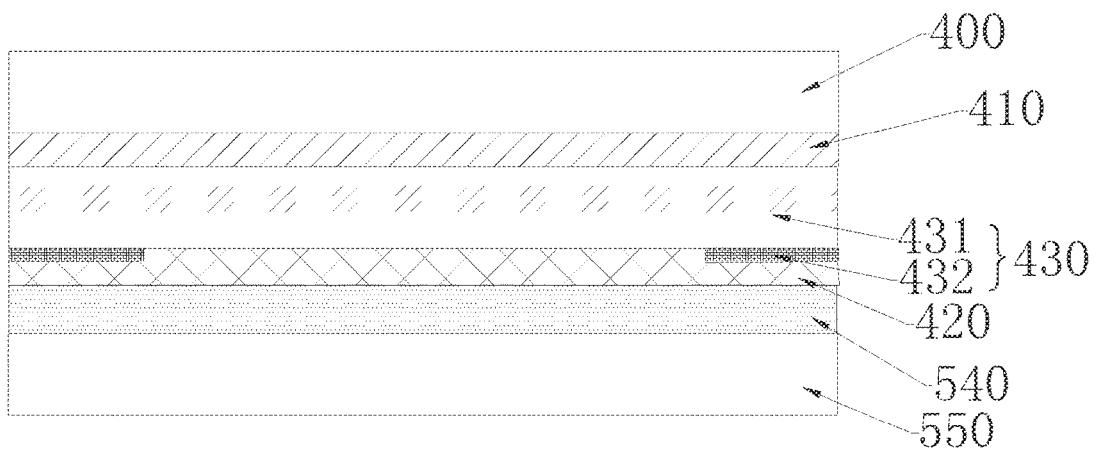
Figure 5E:
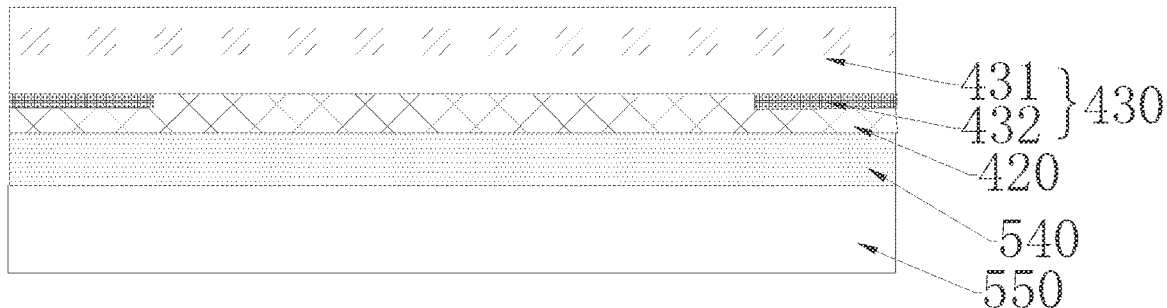
Figure 5F:
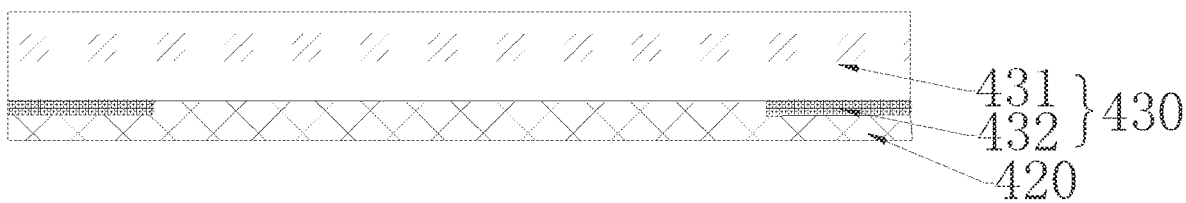

FIGS. 5A~5F shows steps of a manufacturing method of a touch sensor according to the disclosure. FIG. 5F is also a structural view of a touch panel formed by a manufacturing method of the disclosure.

Referring to FIG. 5A. First, a first substrate 400 is provided, and a first release layer 410 is formed on the first substrate 400. The details of the first substrate 400 may refer to the above-mentioned description of substrate 100 or 200. The first release layer 410 is a thin film layer and the details of the first release layer 310 may refer to the above-mentioned description of release layer 110 or 210. Therefore, the contents of substrate 400 and release layer 410 are not repeated herein.

Next, referring to FIG. 5B, a decorative flexible cover 430 is formed on the first release layer 410. The decorative flexible cover 430 may refer to a plate having decoration/shielding functions. For example, a color ink is printed on the plate to provide for the decoration/shielding functions. In a structure of one embodiment, the decorative flexible cover 430 has a thin film layer 431 and a shielding layer 432 disposed on the thin film layer 431. The shielding layer 432 is disposed on at least one side of the thin film layer 431 to shield the peripheral circuit, such that the signal wires located on the peripheral area are not easily seen by the user from the viewing site of the devices. In one embodiment, the shielding layer 432 is disposed on the bottom surface of the thin film layer 431, i.e., the side of the thin film layer 431 that is near to the flexible touch sensing component 420. In another embodiment, the shielding layer 432 may be disposed on the upper surface of the thin film layer 431, i.e., another side of the thin film layer 431 that is opposite to the flexible touch sensing component 420. Alternatively, in other embodiments, the shielding layer 432 may be a deco-film. For example, the deco-film includes a transparent thin film and a shielding ink disposed on the transparent thin film to define a peripheral area. The deco-film may be directly disposed on the upper surface of the flexible cover 430. The materials and structure of the shielding layer 432 may be referred to the shielding layer 272, and therefore the details are not repeated herein.

Next, referring to FIG. 5C, a flexible touch sensing component 420 is formed on the decorative flexible cover 430. In this embodiment, the flexible touch sensing component 420 and the decorative flexible cover 430 are in direct contact with each other, and therefore after the removal of the first substrate 400 and the first release layer 410, the combined decorative flexible cover 430 and the flexible touch sensing component 420 construct as a touch sensor. Compared to the embodiments provided above, there is no additional step or no additional material for bonding the flexible cover 430 and the flexible touch sensing component 420 together. In this circumstance, one process can be omitted, and the touch panel can be lightweight, thin and meanwhile having good optical properties, such as high transmittance. The flexible touch sensing component 420 is a film-type sensor which is similar with the flexible touch sensing component 220. In addition, the film-type sensor may be directly adhered to the flexible cover 430 by adhesion. For example, the thin film of the film-type sensor can be directly adhered to the thin film layer 431 of the flexible cover 430. The film-type sensor in the present example and the film-type sensor in the examples provided above may have the same structure. In other words, the film-type sensor in the examples provided above can be implemented in the present example, and therefore are not repeated herein.

Next, referring to FIG. 5D, a second substrate 550 is formed over the flexible touch sensing component 420, and a second release layer 540 is disposed between the flexible touch sensing component 420 and the second substrate 550. The second release layer 540 and the first release layer 510 may be made of a thin film layer having a releasable ability. However, the chemical compositions of the second release layer 540 and the first release layer 510 can be the same or different. The second substrate 550 and the first substrate 500 may be made of the same material or difference materials.

Next, referring to FIG. 5E, the first substrate 500 is removed by releasing the first release layer 510.

Next, referring to FIG. 5F, the second substrate 550 is removed by releasing the second release layer 540. The two releasing steps may refer to the releasing steps described in the above embodiments.

Through the above steps, a product of a touch panel as shown in FIG. 5F is formed. The upper side of touch panel 40 in FIG. 5F represents the touching site and viewing site of the device of users. The touch panel 40 includes, from top to bottom, the decorative flexible cover 430 and the flexible touch sensing component 420. The flexible touch sensing component 420 and the decorative flexible cover 430 are in direct contact with each other. The details of the structures, materials, manufacturing methods of the abovementioned components are provided above, and therefore are not repeated herein. The touch panel 40 may be used in touch display devices, such as computer system, mobile phones, digital media player, tablet computer, ultra-thin laptop, wearable touch devices, in-vehicle touch monitor, and the like.

The touch panel 40 in one embodiment of the disclosure further includes a flexible electrode component 424. The flexible touch sensing component 420 may be disposed between the flexible electrode component 424 and the decorative flexible cover 430. The details of the touch panel 40 are provided below.

Figure 5G:
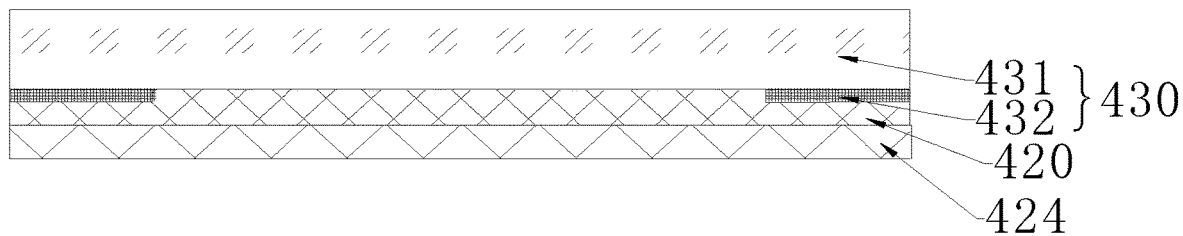
FIG. 5G is a structural view of a touch panel according to one embodiment of the disclosure.

FIG. 5G is a structural view of the touch panel 40 having the flexible electrode component 424 according to one embodiment of the disclosure. In one embodiment, the touch panel 40 further includes a flexible electrode component 424 which is disposed on the flexible touch sensing component 420. In other words, the flexible touch sensing component 420 may be disposed between the flexible electrode component 424 and the thin film layer 431 of the decorative flexible cover 430. Specifically, the flexible electrode component 424 may be formed between the flexible touch sensing component 420 and the second release layer 540. After the second release layer 540 and the second substrate 550 have been removed, the flexible electrode component 424 is exposed, and thus the exposed flexible electrode component 424 can be assembled with a display module (not shown).

Referring to FIG. 2A, the film-type sensor has a thin film 121 and a nano-metal conductive layer 122 formed on the thin film 121. Similarly, the flexible touch sensing component 420 is a film-type sensor, which has the thin film 121 and the nano-metal conductive layer 122. The thin film 121 of the flexible touch sensing component 420 may be directly adhered to the thin film layer 431 of the decorative flexible cover 430. In addition, the thin film 121 of the flexible touch sensing component 420 preferably covers the shielding layer 432. In other words, the nano-metal conductive layer 122 is disposed on a first surface (for example, a bottom surface) of the thin film 121, and the thin film layer 431 of the decorative flexible cover 430 is disposed on a second surface (for example, an upper surface) of the thin film 121, while the flexible electrode component 424 is disposed on the nano-metal conductive layer 122. The flexible electrode component 424 and the nano-metal conductive layer 122 are electrically insulated from each other.

The first nano-metal conductive layer 122 of the flexible touch sensing component 120 shown in FIG. 2B may be applied to a cover plate. For example, the nano-metal conductive layer 122 of the flexible touch sensing component 120 is directly adhered to the thin film layer 431 of the decorative flexible cover 430. The flexible electrode component 424 is disposed on the second nano-metal conductive layer 123. The flexible electrode component 424 and the second nano-metal conductive layer 123 are electrically insulated from each other. Preferably, the shielding layer 432 is covered by the first nano-metal conductive layer 122.

The first nano-metal conductive layer 122 of the flexible touch sensing component 120 shown in FIG. 2C may be applied to a cover plate. For example, the first nano-metal conductive layer 122 of the flexible touch sensing component 120 may be directly adhered to the thin film layer 431 of the decorative flexible cover 430, and the flexible electrode component 424 is disposed on the second nano-metal conductive layer 123. The flexible electrode component 424 and the second nano-metal conductive layer 123 are electrically insulated from each other. Preferably, the shielding layer 432 is covered by the first nano-metal conductive layer 122.

The flexible electrode component 424 serves as an electrode layer for shielding the electrical signal. After assembling the touch panel 40 of one example in the disclosure with the display module (not shown), the flexible electrode component 424 is between the display module and the flexible touch sensing component 420, such that the electromagnetic interference between modules may be prevented.

In the touch sensor, the touch panel and manufacturing method thereof provided in the disclosure. The flexible touch sensing component is formed on the release layer with the support of the first substrate. After releasing the release layer, the touch sensing component is attached with the second substrate to be processed. Again, the processed touch sensing component is released from the second substrate, so that the flexible touch sensing component can be adhered to a desired surface or a desired cover/plate. The touch panel formed is lightweight, thin and low-cost. In addition, the film-type sensor having the nano-metal conductive layer is used as the flexible touch sensing component. Because of the flexibility of the nano-metal materials, the touch sensor and the touch panel provided in the disclosure are suitable to be used in flexible touch displays and curved touch displays. In addition, the bonding layer may be made of a reactive ink layer, which keeps its adhesion ability after the releasing step, therefore the released touch panel can be directly adhered to a desired target substrate without additional optical adhesive layer or a hydrogel layer. Thus the touch panel can be lightweight, thin and meanwhile having good optical properties, such as high transmittance.

The touch sensor and the touch panel provided in the disclosure has a single-layer or a multi-layered electrode component (double-layered, triple-layered or more). The electrode component has flexibility, and thus the electrode component can be used in a planar or non-planar surface (for example, a surface having a curvature). Moreover, the functions of the electrode components can be tailored for different requirements for achieving more touch sensing function or electromagnetic shielding function. As the touch sensor and the touch panel provided in the disclosure are flexible and ductility, they own competitive advantages in the product. In addition, as the touch sensor and the touch panel are provided for bendable displays, foldable displays and rollable displays.

Although the present invention has been described in considerable detail with reference to certain embodiments thereof, but the present invention is not limited thereto. Any modifications, replacements, and variations of the present invention fall within the scope of the present invention.

What is claimed is:

1. A manufacturing method of a touch panel, comprising:
   S1: forming a first release layer on a first substrate;
   S2: forming a flexible touch sensing component on the first release layer;
   S3: forming a second substrate on the flexible touch sensing component, wherein a second release layer is interposed between the flexible touch sensing component and the second substrate;
   S4: removing the first substrate by releasing the first release layer;
   S5: attaching a decorative flexible cover onto the flexible touch sensing component by using a bonding layer, wherein the bonding layer is interposed between the decorative flexible cover and the flexible touch sensing component; and
   S6: removing the second substrate by releasing the second release layer.

2. The manufacturing method of claim 1, wherein the decorative flexible cover comprises a thin film layer and a shielding layer disposed on the thin film layer.

3. The manufacturing method of claim 1, wherein the S5 comprises:
   attaching the bonding layer to the decorative flexible cover; and
   attaching the decorative flexible cover with the bonding layer to the flexible touch sensing component.

4. The manufacturing method of claim 1, wherein the bonding layer is disposed between the flexible touch sensing component and the first release layer, and wherein the bonding layer is exposed after removing the first release layer in the S4, and then the decorative flexible cover is attached to the exposed bonding layer.

5. The manufacturing method of claim 4, further comprising:
   forming a flexible electrode component between the flexible touch sensing component and the bonding layer.

6. The manufacturing method of claim 2, wherein the flexible touch sensing component is a film-type sensor.

7. The manufacturing method of claim 6, wherein the film-type sensor comprises a thin film and a nano-metal conductive layer formed on the thin film, and wherein the nano-metal conductive layer comprises a silver nanowire layer and an overcoat layer.

8. The manufacturing method of claim 6, wherein the film-type sensor comprises a thin film, a first nano-metal conductive layer, and a second nano-metal conductive layer, wherein the first nano-metal conductive layer and the second nano-metal conductive layer are formed on opposite surfaces of the thin film, and wherein the first nano-metal conductive layer or the second nano-metal conductive layer comprises a silver nanowire layer and an overcoat layer.

9. The manufacturing method of claim 8, wherein the silver nanowire layer is electrically connected to a peripheral circuit, and wherein the peripheral circuit is shielded by the shielding layer.

10. The manufacturing method of claim 6, wherein the film-type sensor comprises a first thin film, a first nano-metal conductive layer formed on the first thin film, a second thin film, and a second nano-metal conductive layer formed on the second thin film, wherein the first thin film and the second thin film are attached to each other, and wherein the first nano-metal conductive layer and the second nano-metal conductive layer face in opposite directions.

11. The manufacturing method of claim 10, wherein the film-type sensor further comprises a peripheral circuit electrically connected to the first nano-metal conductive layer and the second nano-metal conductive layer, and wherein the peripheral circuit is shielded by the shielding layer.

12. The manufacturing method of claim 1, wherein the S1 and S2 are performed in a roll-to-roll process.

13. The manufacturing method of claim 1, wherein in the S4, the first release layer is completely removed or partially removed.

14. The manufacturing method of claim 1, further comprising:
    forming a flexible electrode component between the flexible touch sensing component and the first release layer, or
    forming the flexible electrode component between the flexible touch sensing component and the second release layer.

15. A manufacturing method of a touch panel, comprising:
    S1: forming a first release layer on a first substrate;
    S2: forming a shielding layer and a flexible touch sensing component on the first release layer, wherein the shielding layer defines a peripheral area;
    S3: forming a second substrate on the flexible touch sensing component, wherein a second release layer is interposed between the flexible touch sensing component and the second substrate;
    S4: removing the first substrate by releasing the first release layer;
    S5: attaching a flexible cover to the flexible touch sensing component by using a bonding layer, wherein the bonding layer is interposed between the flexible cover and the flexible touch sensing component; and
    S6: removing the second substrate by releasing the second release layer.

16. The manufacturing method of claim 15, wherein the shielding layer is formed by printing a colored material on the flexible touch sensing component in the S2.

17. The manufacturing method of claim 15, further comprising:
    forming a flexible electrode component between the flexible touch sensing component and the first release layer, wherein the shielding layer is formed by printing a colored material on the flexible electrode component in the S2.

18. The manufacturing method of claim 15, wherein the S5 comprises:
    attaching the bonding layer to the flexible cover; and
    attaching the flexible cover having the bonding layer to the flexible touch sensing component and the shielding layer.

19. The manufacturing method of claim 15, wherein the bonding layer is disposed between the flexible touch sensing component and the first release layer, and wherein the bonding layer is exposed after removing the first release layer in the S4, and then the flexible cover is adhered to the exposed bonding layer.

20. The manufacturing method of claim 19, further comprising:
    forming a flexible electrode component between the flexible touch sensing component and the bonding layer, wherein the shielding layer is formed by printing a colored material on the flexible electrode component in the S2.

21. The manufacturing method of claim 16, wherein the flexible touch sensing component is a film-type sensor.

22. The manufacturing method of claim 21, wherein the film-type sensor comprises a thin film and a nano-metal conductive layer formed on the thin film, and wherein the nano-metal conductive layer comprises a silver nanowire layer and an overcoat layer.

23. The manufacturing method of claim 21, wherein the film-type sensor comprises a thin film, a first nano-metal conductive layer, and a second nano-metal conductive layer, wherein the first nano-metal conductive layer and the second nano-metal conductive layer are formed on opposite surfaces of the thin film, and wherein the first nano-metal conductive layer or the second nano-metal conductive layer comprises a silver nanowire layer and an overcoat layer.

24. The manufacturing method of claim 23, wherein the silver nanowire layer is electrically connected to a peripheral circuit, and wherein the peripheral circuit is shielded by the shielding layer.

25. The manufacturing method of claim 21, wherein the film-type sensor comprises a first thin film, a first nano-metal conductive layer formed on the first thin film, a second thin film, and a second nano-metal conductive layer formed on the second thin film, wherein the first thin film and the second thin film are attached to each other, and wherein the first nano-metal conductive layer and the second nano-metal conductive layer face in opposite directions.

26. The manufacturing method of claim 25, wherein the film-type sensor further comprises a peripheral circuit electrically connected to the first nano-metal conductive layer and the second nano-metal conductive layer, and wherein the peripheral circuit is shielded by the shielding layer.

27. The manufacturing method of claim 21, wherein the film-type sensor comprises a thin film and a transferable transparent conductive film attached to the thin film.

28. The manufacturing method of claim 15, wherein the S1 and S2 are performed in a roll-to-roll process.

29. The manufacturing method of claim 15, wherein in the S4, the first release layer is completely removed or partially removed.

30. The manufacturing method of claim 15, further comprising:
    forming a flexible electrode component between the flexible touch sensing component and the second release layer.

31. The manufacturing method of claim 30, wherein the flexible electrode component has a thin film and a nano-metal conductive layer formed on the thin film, and wherein the nano-metal conductive layer comprises a silver nanowire layer and an overcoat layer.

* * * * *